United States Patent
Eom et al.

(10) Patent No.: US 11,126,140 B2
(45) Date of Patent: Sep. 21, 2021

(54) ELECTRONIC DEVICE, EXTERNAL DEVICE CAPABLE OF BEING COMBINED WITH THE ELECTRONIC DEVICE, AND A DISPLAY METHOD THEREOF

(71) Applicant: Samsung Electronics Co., Ltd., Suwon-si (KR)

(72) Inventors: Yu-youl Eom, Yongin-si (KR); Young-ho Kim, Yongin-si (KR); Dan Nah, Anyang-si (KR); Deung-hyeon Jeong, Suwon-si (KR); Ji-yeon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 452 days.

(21) Appl. No.: 16/133,096

(22) Filed: Sep. 17, 2018

(65) Prior Publication Data

US 2019/0271940 A1    Sep. 5, 2019

(30) Foreign Application Priority Data

Mar. 5, 2018    (KR) .................. 10-2018-0025902

(51) Int. Cl.
*G03H 1/08*    (2006.01)
*G03H 1/00*    (2006.01)
*G03H 1/04*    (2006.01)
(Continued)

(52) U.S. Cl.
CPC ......... *G03H 1/0005* (2013.01); *G03H 1/0443* (2013.01); *G06F 3/017* (2013.01); *G06N 20/00* (2019.01); *G03H 2001/0452* (2013.01)

(58) Field of Classification Search
CPC ............... G03H 1/0005; G03H 1/0443; G03H 2001/0452; G03H 1/00; G03H 2001/0061;
(Continued)

(56) References Cited

U.S. PATENT DOCUMENTS 8,018,579 B1 *   9/2011   Krah .................. G06F 3/005
                                                    356/4.01
8,810,513 B2 *   8/2014   Ptucha .................. G06F 3/017
                                                    345/158
(Continued)

FOREIGN PATENT DOCUMENTS

JP      2014-107725 A      6/2014
KR      10-2015-0091709 A  8/2015
(Continued)

OTHER PUBLICATIONS

Aryzon, https://www.aryzon.com/ https://www.kickstarter.com/projects/aryzoniaryzon-3d-augmented-reality-for-every-smartphone/faqs, 2018.

*Primary Examiner* — Arnel C Lavarias
(74) *Attorney, Agent, or Firm* — Jefferson IP Law, LLP

(57) ABSTRACT

An electronic device including a display, a sensor, and a processor. The processor is configured to, based on an interaction mode which is operated according to a user interaction being initiated, control the sensor to detect a position of a user, control the display to display a graphic object at a position corresponding to the detected position, and change, based on the user interaction being input in the interaction mode, the graphic object and control the display to provide feedback regarding the user interaction.

17 Claims, 26 Drawing Sheets

(51) Int. Cl.
*G06F 3/01* (2006.01)
*G06N 20/00* (2019.01)

(58) Field of Classification Search
CPC ...... G03H 1/08; G03H 2210/32; G06N 20/00; G06F 3/017; G06F 3/01; G06F 3/011; G06F 3/048; G06F 3/0481; G06F 3/04812; G06F 3/04815; G06F 3/04817; G06F 3/0482; G06F 3/0483; G06F 3/0484; G06F 3/04842
USPC .......... 359/9, 1, 13, 14, 32, 33, 35; 382/154, 382/155, 156; 345/419; 706/11; 715/700, 705, 706, 707, 714
See application file for complete search history.

(56) References Cited

U.S. PATENT DOCUMENTS

| | | | |
|---|---|---|---|
| 2011/0107216 A1* | 5/2011 | Bl | ............................ G06F 3/017 715/716 |
| 2015/0220058 A1 | 8/2015 | Mukhtarov et al. | |
| 2016/0140763 A1 | 5/2016 | Seichter et al. | |
| 2017/0023911 A1 | 1/2017 | Russell et al. | |
| 2018/0041695 A1 | 2/2018 | Park | |
| 2019/0121522 A1* | 4/2019 | Davis | .................. G06F 3/04815 |

FOREIGN PATENT DOCUMENTS

| | | |
|---|---|---|
| KR | 10-1666500 B1 | 10/2016 |
| KR | 10-1690646 B1 | 12/2016 |
| KR | 10-2017-0131790 A | 11/2017 |
| KR | 10-2017-0133124 A | 12/2017 |

* cited by examiner

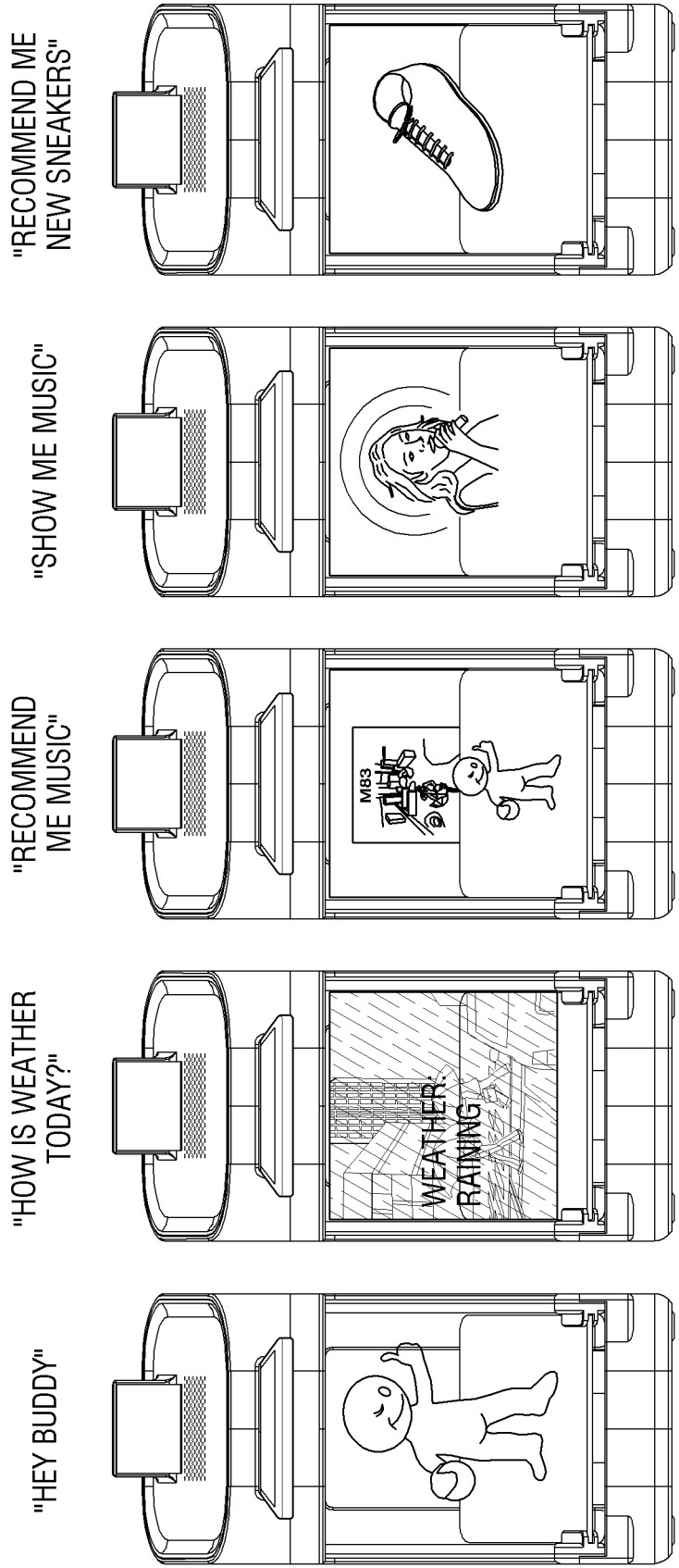

ELECTRONIC DEVICE, EXTERNAL DEVICE CAPABLE OF BEING COMBINED WITH THE ELECTRONIC DEVICE, AND A DISPLAY METHOD THEREOF

CROSS-REFERENCE TO RELATED APPLICATION(S)

This application is based on and claims priority under 35 U.S.C. § 119(a) of a Korean patent application number 10-2018-0025902, filed on Mar. 5, 2018, in the Korean Intellectual Property Office, the disclosure of which is incorporated by reference herein in its entirety.

BACKGROUND

1. Field

The disclosure relates to apparatuses and methods consistent with example embodiments related to an electronic device, an external device capable of being combined with the electronic device, and a display method and service providing method of the electronic device. More particularly, the disclosure relates to various service providing methods utilizing a graphic object displayed as a three dimensional (3D) character and the like.

In addition, the disclosure relates to an artificial intelligence (AI) system for mimicking functions such as cognition, decisions of a human brain, and the like, using a machine learning algorithm, and an application thereof.

2. Description of Related Art

The AI system is a computer system which implements intelligence of a human level, and is a system in which a machine learns and decides by itself to get smart, unlike previous rules-based smart system. As the AI system is used more and more, a recognition rate is improved and thus, a taste of a user is understood more accurately. Accordingly, the previous rules-based smart system is gradually replaced with a deep-learning AI system.

The AI technology includes a machine learning (deep learning) and element technologies using the machine learning.

The machine learning is an algorithm technology which classifies and learns features of input data by itself. The element technology is a technique that uses a machine learning algorithm such as deep learning and the like, which includes technical fields including linguistic understanding, visual understanding, inference/prediction, knowledge expression, motion control and the like.

Various fields to which the AI technology is applied are as follows. The linguistic understanding is a technique of recognizing a language and character of human and applying and processing the same, which includes natural language processing, machine translation, conversation system, question and answer, voice recognition and synthesis and the like. The visual understanding is a technique of recognizing and processing an object just like a human sight, which includes object recognition, object tracking, image search, human recognition, scene understanding, space understanding, image improvement and the like. The inference prediction is a technique of determining information and make a logical inference and prediction, which includes knowledge/probability-based inference, optimization prediction, preference-based plan, recommendation and the like. The knowledge expression is a technique of performing automation processing with respect to experience information of human with knowledge data, which includes knowledge construction (data generation/classification), knowledge management (data usage) and the like. The motion control is a technique of controlling an autonomous driving of a vehicle and movement of a robot, which includes a motion control (navigation, collision, drive), manipulation control (behavioral control) and the like.

In recent years, an electronic device in which various forms of AI secretary functions are provided has been distributed. However, a related art AI secretary service function is provided to a user mainly through voice recognition. For example, when a user asks a simple question "How is the weather today?" an electronic device provides information such as "Tomorrow, Yongin-si, Suji-gu, there will be a lot of clouds in the sky. It is expected that the highest temperature is 28 degrees and the lowest temperature is 15 degrees," through voice. Accordingly, when information is provided through voice, even if the user wants to obtain simple information, there is an inconvenience to listen to a voice for a long time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for resolving an inconvenience of the previous voice secretary function and providing various interactions to various user interactions, an external device, and a service providing method.

Additional aspects will be set forth in part in the description which follows and, in part, will be apparent from the description, or may be learned by practice of the presented embodiments.

In accordance with an aspect of the disclosure, an electronic device is provided. The electronic device includes a display, a sensor, and a processor. The processor may, based on an interaction mode which is operated according to a user interaction being initiated, control the sensor to detect a position of a user, control the display to display a graphic object at a position corresponding to the detected user position, and based on the user interaction being input in the interaction mode, change the graphic object and control the display to provide feedback regarding the user interaction.

The sensor may include a first camera which is disposed in a direction of the display. The processor may, based on the interaction mode being initiated, activate the first camera and detect the user position through an image acquired by the first camera.

The sensor may further include a second camera which is disposed in an opposite direction to the first camera. The processor may, based on the interaction mode being initiated, activate the first camera and the second camera, respectively, and adjust a display state of the graphic object in accordance with an image acquired by the second camera.

The processor may analyze a user image acquired by the first camera and estimates an emotion of the user, and determine a look of face of the graphic object according to the estimated user emotion.

The interaction mode may be a voice recognition mode which is operated according to a user voice. The processor may constantly change the graphic object to correspond to an input process of the user voice and a processing process of the user voice.

The interaction mode may be a motion recognition mode which is operated according to a user motion. The processor may constantly change the graphic object to correspond to an input process of the user voice and a processing process of the user motion.

The processor may, based on the electronic device being positioned on a wireless charging device and wireless charging being initiated, determine that the interaction mode is initiated, and control the display to display the graphic object.

The processor may, based on the electronic device being docked with an external device, determine that the interaction mode is initiated, and control the display to display the graphic object.

The processor may input the user image to an artificial intelligence (AI) neural network model and estimate the user emotion.

According to an aspect of an embodiment of the disclosure, a displaying method of an electronic device is provided. The method includes, based on an interaction mode which is operated according to a user interaction being initiated, detecting a position of a user, on a display of the electronic device, displaying a graphic object at a position corresponding to the user position, and based on the user interaction being input in the interaction mode, changing the graphic object and providing feedback regarding the user interaction.

The detecting the user position may include, based on the interaction mode being initiated, activating a first camera which is disposed in a direction of the display, and detecting the user position through an image acquired by the first camera.

The displaying method may further include activating a second camera which is disposed in an opposite direction to the first camera, and adjusting a display state of the graphic object in accordance with an image acquired by the second camera.

The displaying method may further include analyzing a user image acquired by the first camera and estimating an emotion of the user, and determining a look of face of the graphic object according to the estimated user emotion.

The interaction mode may be a voice recognition mode which is operated according to a user voice. The providing the feedback regarding the user interaction may include constantly changing the graphic object to correspond to an input process of the user voice and a processing process of the user voice.

The interaction mode may be a motion recognition mode which is operated according to a user motion. The providing the feedback regarding the user interaction may include constantly changing the graphic object to correspond to an input process of the user motion and a processing process of the user motion.

The method may further include, based on the electronic device being positioned on a wireless charging device and wireless charging being initiated, determining that the interaction mode is initiated.

The method may further include, based on the electronic device being docked with an external device, determining that the interaction mode is initiated.

The estimating the user emotion may further include inputting the user image to an AI neural network model and estimating the user emotion.

In accordance with an aspect of the disclosure, a recording medium in which a program to carry out a user interaction is stored is provided. The user interaction includes, based on an interaction mode which is operated according to a user interaction being initiated, activating a front camera and a rear camera, detecting a user position through an image acquired by the front camera, detecting a surrounding background through an image acquired by the rear camera, displaying a graphic object in a form corresponding to the surrounding background at a position corresponding to the user position, and based on the user interaction being input in the interaction mode, changing the graphic object and providing feedback regarding the user interaction.

According to various embodiments of the disclosure described above, the electronic device may display a graphic object in various methods according to a user interaction and a background image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 9A, 9B, 9C, and 9D are diagrams illustrating an example method for displaying various graphic objects, according to various embodiments of the disclosure;

Throughout the drawings, it should be noted that like reference numbers are used to depict the same or similar elements, features, and structures.

DETAILED DESCRIPTION

Figure 1:
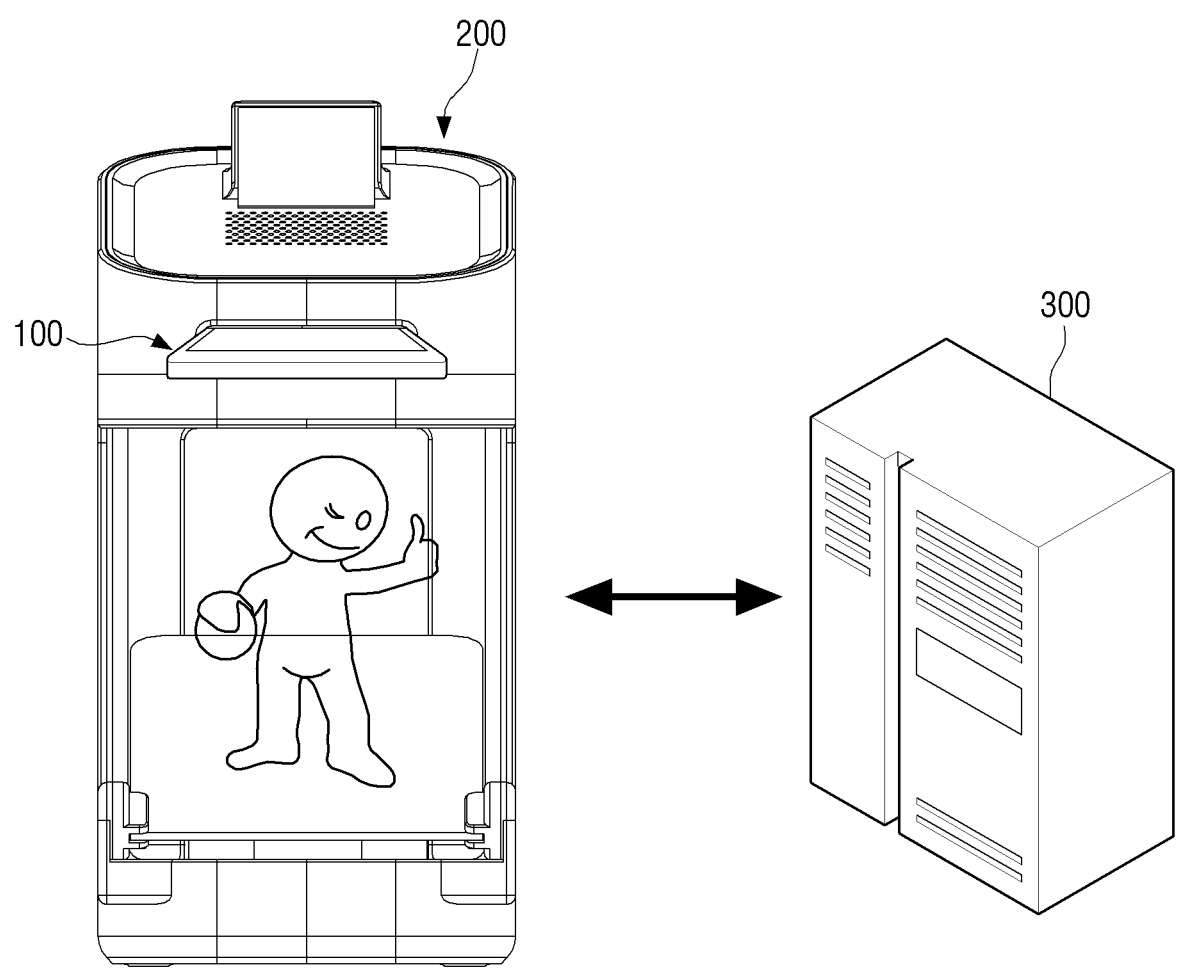
FIG. 1 is a diagram illustrating an example of an electronic device, an external device, and a server, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the example embodiments of the disclosure are general terms which are widely used now and selected considering the functions of the disclosure. However, the terms may vary depending on the intention of a person skilled in the art, a precedent, or the advent of new technology. In addition, in a special case, terms selected by the applicant may be used. In this case, the meaning of the terms will be explained in detail in the corresponding detailed descriptions. Accordingly, the terms used in the description should not necessarily be construed as simple names of the terms, but be defined based on meanings of the terms and overall contents of the disclosure.

The example embodiments may vary, and may be provided in different embodiments. Various example embodiments will be described with reference to accompanying drawings. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

In the disclosure, relational terms such as first and second, and the like, may be used to distinguish one entity from another entity, without necessarily implying any actual relationship or order between such entities. In embodiments of the disclosure, relational terms such as first and second, and the like, may be used to distinguish one entity from another entity, without necessarily implying any actual relationship or order between such entities.

In an example embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor except for 'modules' or 'units' that should be realized in a specific hardware.

Further, in the disclosure, a case in which any one part is connected with the other part includes a case in which the parts are directly connected with each other and a case in which the parts are electrically connected with each other with other elements interposed therebetween. Further, when a certain portion is stated as "comprising" a certain element, unless otherwise stated, this means that the certain portion may include another element, rather than foreclosing the same.

The above and other aspects of the disclosure will become more apparent by describing in detail embodiments thereof with reference to the accompanying drawings. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

FIG. 1 is a diagram illustrating an example of an electronic device, an external device, and a server, according to an embodiment of the disclosure.

Referring to FIG. 1, a service providing system may include an electronic device 100, an external device 200 which is capable of being combined with the electronic device 100, and a server 300. A service as provided herein is a service which provides a service according to a state of the user, and may be an artificial intelligence (AI) secretary service which recognizes a voice or motion of the user and provides a service corresponding to the recognized voice or the recognized motion.

The electronic device 100 may be combined with the external device 200 and display a pseudo hologram. In this regard, the pseudo hologram may be a graphic object which is displayed on the external device 200 based on a graphic object displayed on the electronic device 100. The graphic object may be implemented in the form of a character as illustrated in FIG. 1, but is not limited thereto. The graphic object may be in various forms such as a text, icon and design for providing information.

The electronic device 100 may display a graphic object based on a state of the user. For example, the electronic device 100 may display a graphic object in different forms according to a position of the user. In addition, the electronic device 100 may change a graphic object based on a user voice, a user motion, and the like. In addition, the electronic device 100 may analyze the user voice, the user motion, and the like to provide various services. A service provided to the user may be, of course, received from the server 300 or determined by the electronic device 100. Hereinafter, unless otherwise specified, various user inputs, such as a user voice, a user motion, a user position, a user gesture, and the like, will be commonly called a user interaction.

Meanwhile, the electronic device 100 may be implemented as a smartphone, but is not limited thereto. The electronic device 100 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), and a Moving Picture Experts Group phase 1 or phase 2 (MPEG-1 or MPEG-2) audio layer 3 (MP3) player.

In another embodiment, the electronic device 100 may be home appliance. The home appliance may, for example, include at least one of a television, a digital versatile disc (DVD) player, a stereo, a refrigerator, an air conditioner, a cleaner, an oven, a microwave, a washing machine, an air purifier, a set-top box, a home automation control panel, a security control panel, a television (TV) box (e.g., Samsung HomeSync™, an Apple TV™, or a Google TV™), a game console (e.g., Xbox™ and PlayStation™), an electronic dictionary, an electronic key, a camcorder, and an electronic frame.

The external device 200 is an apparatus which is coupled with the electronic device 100 and displays a graphic object displayed on the electronic device 100. In FIG. 1, the electronic device 100 and the external device 100 may be physically combined with each other and the external device 200 may display a screen displayed on the electronic device 100 as it is. In the disclosure, the electronic device 100 and the external device 200 are physically combined with each other, but the example is not limited thereto. That is, the external device 200 may, of course, receive data with respect to an image to be displayed from the electronic device 100, and process the received data and display the graphic object.

The server 300 is a configuration for receiving data from the electronic device 100 and providing a service corresponding to the received data. For example, the server 300 may receive data from the electronic device 100. The server 300 may analyze the received data and determine a service corresponding to the analyzed data. In this regard, the data received by the server 300 may be data in relation to voice data of a user and motion data of the user.

The service providing system 100 according to the disclosure may be implemented as an electronic device 100, an external device 200, and a server, but is not limited thereto. The service providing system 100 may, of course, be implemented as an independent apparatus which is capable of carrying out all functions of the electronic device 100, the external device 200 and the server 300.

The configurations and operations of the electronic device 100, the external device 200, and the server 300 according to an example embodiment will be described in greater detail below.

Figure 2A:
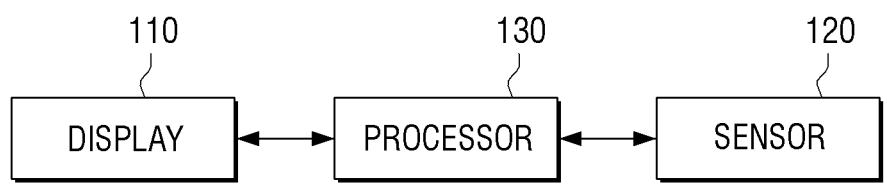
FIGS. 2A and 2B are block diagrams illustrating a configuration of an electronic device, according to various embodiments of the disclosure.

FIG. 2A is a block diagram illustrating an example configuration of an electronic apparatus according to an embodiment of the disclosure.

Referring to FIG. 2A, the electronic device 100 includes a display 110, a sensor 120, and a processor 130.

The display 110 is a configuration for displaying various images. In more detail, the display 110 may display a graphic object corresponding a user's position and change a graphic object so that feedback relating to a user interaction is provided.

The sensor 120 is a configuration for detecting various information. In more detail, the sensor 120 may detect a user's position. The sensor 120 may include a first camera and a second camera. In this regard, the first camera may be disposed in the direction of a display, and the second camera may be disposed in the opposite direction to the first camera. The first camera may detect a user's position, and the second camera may acquire a background image.

The processor 130 controls an overall operation of the electronic device 100. In more detail, when an interaction mode that operates according to a user's interaction is initiated, the processor 130 may control the display 110 to display a graphic object at a position corresponding to the user's position detected through the sensor 120. When a user's interaction is input after the interaction mode is initiated, the processor 130 may change a graphic object to correspond to the user's interaction and control the display 110 to provide feedback relating to the user's interaction.

When the interaction mode is initiated, the processor 130 may activate the first camera and detect a user's position acquired by the camera. The processor 130 may control the display 120 to display a graphic object based on the acquired user's position. For example, when the user's position is a left side of the electronic device 100, the processor 130 may display a graphic object on the right side of the display 110. In addition, when the user's position is a right side of the electronic device 100, the processor 130 may display a graphic object on the left side of the display 110.

In addition, the processor 130 may activate the second camera and acquire a background image. The processor 130 may display a graphic object based on the acquired background image. In more detail, when the first camera and the second camera photograph the opposite directions, a background image acquired through the second camera may be a background image in the same direction as the background that the user views. For example, when a sofa is present in a background viewed by the user and the background image acquired by the second camera, the processor 130 may display a graphic object so that a graphic object realized as a character is positioned near the sofa.

If various conditions are met, the processor 130 may initiate the interaction mode. In an example embodiment, when the electronic device 100 is coupled with the external device 200, the processor 130 may initiate the interaction mode. In more detail, in a case in which the external device 200 includes a configuration for wireless charging, when the wireless charging is initiated, the processor 130 may initiate the interaction mode and control the display 110 to display a graphic object. When the electronic device 100 and the external device 200 are docked with each other, the processor 130 may initiate the interaction mode and control the display 10 to display a graphic object.

In another example embodiment, after the wireless charging is initiated or docking is complete, when a particular user command is input, the processor 130 may initiate the interaction mode. That is, according to an example embodiment, when the wireless charging is initiated or the electronic device 100 is docked with the external electronic device 200, the processor 130 may control the electronic device 100 to be in a standby mode state in which a user command is input to execute the interaction mode. In the standby mode state, when a user command is input, the processor 130 may initiate the interaction mode. In this regard, the user command may be a voice command of the user or a motion command of the user. For example, when a predetermined voice command, such as "Hey, buddy" or a predetermined motion command to wave hand left to right is input, the processor 130 may initiate the interaction mode.

In this regard, the interaction mode may be a voice recognition mode to operate according to a user voice. When the interaction mode is a voice recognition mode, the processor 130 may constantly change a graphic object to correspond to an input process and processing process of an input user voice. In addition, the interaction mode may be a motion recognition mode to operate according to a user's motion. When the interaction mode is a motion recognition mode, the processor 130 may constantly change a graphic object to correspond to an input process and processing process of a user's motion.

When the interaction mode is executed, the processor 130 may receive various user interactions and provide feedback corresponding to the user interactions.

The user's interaction according to an example embodiment may be in various forms. For example, the user's interaction may be a user input using a user's voice, a user's gesture, or a remote control device.

When the user's interaction is a user's voice, the electronic device 100 may analyze the user's voice and carry out a command corresponding to the user's voice. In this regard, a command corresponding to the user's voice may be a command of a pre-stored form. For example, a power-on/power-off function corresponding to a supervised, such as "turn on power" and "turn off power" is pre-stored, the electronic device 100 may determine a supervised corresponding to the user's voice and carry out a function corresponding to the determined instruction. However, the example is not limited thereto, and even if a user voice that is not a user voice corresponding to a pre-stored instruction is input, the electronic device 100 may analyze the user's voice and determine a user's intention, and carry out a function corresponding to the user's intention. In this regard, the identification of the user's intention may be carried out in the electronic device 100, but may, of course, be carried out in the server 300 as will be described later.

When the user's interaction is a user's gesture, the electronic device 100 may carry out a function corresponding to the user's gesture. In an example embodiment, the function corresponding to the user's gesture may include a gesture indicating start of the gesture, a gesture for selecting a particular item or a particular user interface (UI), a gesture for dragging a particular area, a gesture for rotating a particular area, a gesture for translating a particular area, and a gesture for swipe operation. In addition to a gesture for carrying out the particular function described above, the user's interaction may include a gesture for communing with a graphic object displayed on the display 110. For example, the user's interaction may be a gesture to pat a graphic object or a gesture to slap high-fives with a graphic object.

Figure 2B:
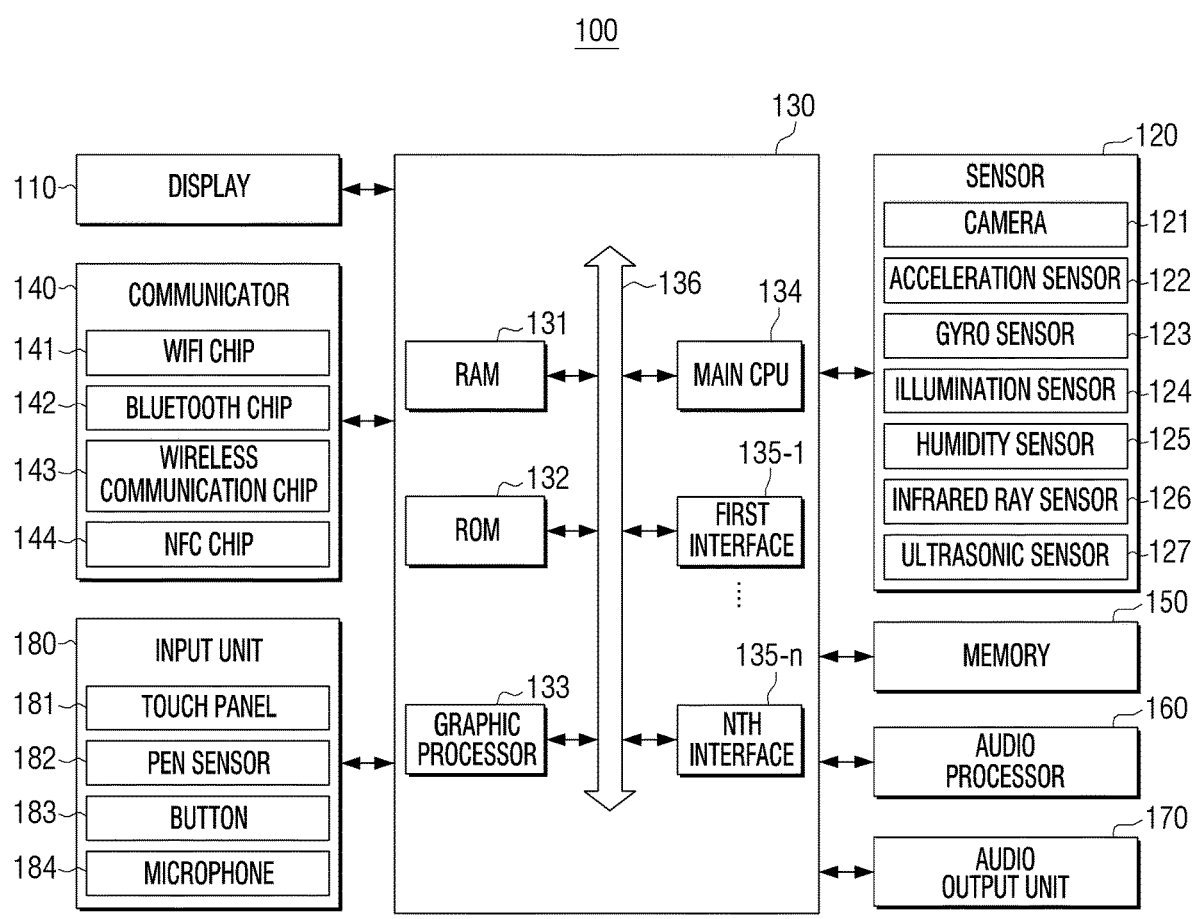

FIG. 2B is a block diagram of a detailed configuration of an electronic device, according to an embodiment of the disclosure.

Referring to FIG. 2B, the electronic device 100 may further include not only a display 110, a sensor 120 and a processor 130, but also a communicator 140, a memory 150, an audio processor 160, an audio output unit 170, and an input unit 180.

The display 110 may display various screens as described above. The display 110 may be implemented as a display panel of various shapes. For example, the display panel may be implemented with various display technologies such as liquid crystal display (LCD), organic light emitting diode (OLED), active-matrix organic light-emitting diode (AM-OLED), liquid crystal on silicon (LCOS), or digital light processing (DLP).

The display 110 may be implemented in a form of a flexible display form and may be connected to at least one of a front area, a side area, and a rear area of the electronic device 100. Due to a substrate as thin and flexible as a paper sheet, the flexible display may have such characteristic that it can be bent, curved, or rolled without being damaged. The flexible display may be manufactured using a plastic substrate as well as a glass substrate which is generally used. When the plastic substrate is used, a low temperature manufacturing process may be used instead of an existing manufacturing process to avoid damage on the substrate. Also, a glass substrate enclosing a flexible liquid crystal may be replaced with a plastic film so as to give flexibility enabling folding and unfolding. Such a flexible display may be thin, light and even resistant to an impact or a shock, and can be twisted or bended. The flexible display also may be embodied in various forms.

The sensor 120 may be implemented in various types to detect various information. In more detail, the sensor 120 may include a camera 121, an acceleration sensor 122, a gyro sensor 123, an illumination sensor 124, a humidity sensor 125, an infrared ray sensor 126, an ultrasonic sensor 127, and the like.

The camera 121 may capture a still image and a moving image. For example, the camera 121 may include at least one image sensor, a lens, an image signal processor (ISP), or a flash (e.g., light emitting diode (LED), xenon lamp, and the like), and may include a plurality of cameras 121. In more detail, the camera 121 may include a first camera and a second camera. In this regard, the first camera may be disposed in the direction of a display, and the second camera may be disposed in the opposite direction to the first camera. The first camera may detect a user's position, and the second camera may acquire a background image.

The acceleration sensor 122 is a configuration for measuring an acceleration of the electronic device 100, and the gyro sensor 123 is a sensor which recognizes a 6 axle direction by exerting rotation to the previous acceleration sensor so that a more elaborate and precise operation can be recognized.

The illumination sensor 124 is a sensor which is capable of detecting a peripheral illumination, and may be used to adjust a brightness of the display 110 according to the peripheral illumination. The humidity sensor 125 is a sensor which is capable of detecting peripheral humidity, and may be used to provide peripheral environment information.

The infrared ray sensor 126 and the ultrasonic sensor 127 are a sensor which is capable of detecting a distance from an external object. In an example embodiment, the processor 130 may determine a user's position by using the infrared ray sensor 126 or the ultrasonic sensor 127 instead of the first camera.

The above-described various types of sensors may, of course, be added or omitted as necessary.

The communicator 140 may communicate with an external device. In particular, the communicator 140 may include various communication chips such as a Wi-Fi chip 141, a Bluetooth chip 142, a wireless communication chip 143, and a near field communication (NFC) chip 144. The Wi-Fi chip 141, the Bluetooth chip 142, and the NFC chip 144 communicate using local area network (LAN), Wi-Fi, Bluetooth, and NFC, respectively. In the case of using the Wi-Fi chip 141 or the Bluetooth chip 142, various connection information such as service set identifier (SSID) and session key may be transmitted and received first, and various information may be transmitted and received after communication is built by using it. The wireless communication chip 143 may be a chip configured to perform communication according to various communication standards, such as Institute of Electrical and Electronics Engineers (IEEE), Zigbee, 3rd generation (3G), 3rd generation partnership project (3GPP), or long term evolution (LTE).

The memory 150 may store various programs and data necessary for the operation of the electronic device 100. The memory 150 may be implemented as a non-volatile memory, a volatile memory, a flash memory, a hard disk drive (HDD) or a solid state drive (SDD).

The audio processor 160 is a component that performs the processing for audio data. In the audio processor 160, various processes such as decoding or amplification of audio data, noise filtering, and the like may be carried out. The audio data processed in the audio processor 160 may be output to the audio output unit 170.

The audio output unit 170 may be configured to output various notification sounds or voice messages as well as various audio data which undergone various processing operations such as decoding, amplifying, and noise filtering in the audio processor 160. Specifically, the audio output unit 170 may be implemented to be speaker; this is merely one of various embodiments of the disclosure. The audio output unit 170 may be implemented to be output component that can output the audio data.

The input unit 180 may include a touch panel 181, a pen sensor 182, a button 183 and a microphone 184 to receive various inputs. The touch panel 181 may be configured as being coupled to the display 110 and a touch sensor may use at least one of among a capacitive-type, a resistive-type, an infrared ray-type, and an ultrasonic-type. The touch panel may have not only a display function, but also a function to detect a touch input position, a touched area, and also a touch input pressure. Further, the touch screen may have a function to detect a proximity touch as well as a real touch. The pen sensor 182 may be implemented as a portion of the touch panel 181 or may include an additional recognizable sheet. The button 183 may include a physical button, an optical key, or a keypad. The microphone 184 may include at least one of a built-in microphone or an external microphone.

In particular, the input unit 180 may receive an external command from the various configurations described above and transfer the received external command to the processor 130. The processor 130 may generate a control signal corresponding to the received input and control the electronic device 100.

The processor 130 may control an overall operation of the electronic device 100 by using various types of programs stored in the memory 150.

The processor 130 may include the random access memory (RAM) 131, the read only memory (ROM) 132, a graphic processor 133, a main central processing unit (CPU) 134, first through nth interfaces 135-1 through 135-n, and a bus 136. The RAM 131, the ROM 132, the graphic processor 133, the main CPU 134, and the first to the nth interface 135-1~135-n may be interconnected through the bus 136.

The RAM 131 stores an operating system (OS) and an application program. In detail, if the electronic apparatus 100 is booted, the OS may be stored in the RAM 131, and various types of application data selected by the user may be stored in the RAM 131.

The ROM 132 may store a command set, and the like for system booting. When a turn-on command is input and thus the electric power is supplied, the main CPU 134 may copy the stored OS in the memory 150 to RAM 131 according to the commands stored in ROM 132, and boot the system by executing OS. In response to the booting being completed, the main CPU 134 may copy various application programs stored in the memory 150 to the RAM 131, and execute the application programs copied to the RAM 131 to perform various operations.

The graphic processor 133 generates a screen including various types of objects such as an item, an image, a text, and the like by using an operator and a renderer. Herein, the calculator may be configured to calculate attribute values such as coordinate values, shape, size or color in which each object will be displayed according to the layout of the screen by using the controlling command received from the input unit 180. Further, the renderer may be configured to generate various layouts of screens including objects based on the attribute values calculated at the calculator. The screen generated by the renderer may be displayed in a display area of the display 110.

The main CPU 134 accesses the memory 150 to perform booting using the OS stored in the memory 150. The main CPU 134 performs operations using a variety of programs, content, data, and the like, stored in the memory 150.

The first to the nth interface (145-1 to 145-n) are connected to the above-described various elements. One of the first to the n interface 145-1 to 145-n may be network interface connected with an external device through network.

Figure 3:
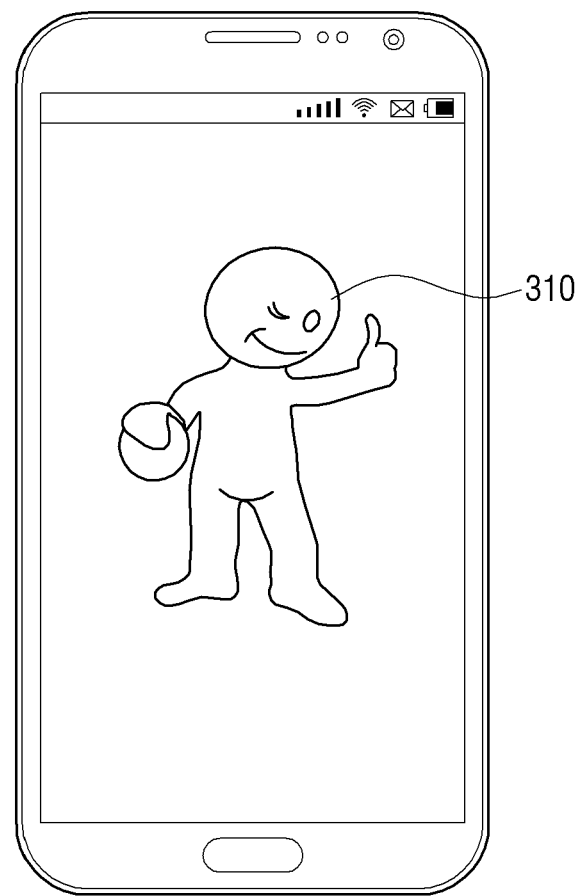
FIG. 3 is a diagram illustrating an example graphic object, according to an embodiment of the disclosure.

FIG. 3 is a diagram illustrating an example graphic object, according to an embodiment of the disclosure.

Referring to FIG. 3, when an interaction mode is initiated, the electronic device 100 may display a graphic object. In this regard, the graphic object may be differently displayed according to a user's position. For example, when the user is positioned on the left side of the electronic device 100, the graphic object 310 may be displayed on the right side of the display 110. When the user is positioned on the right side of the electronic device 100, the graphic object may be displayed on the left side of the display 110. In addition, the electronic device 100 may change a size of the graphic object 310 according to a distance between the electronic device 100 and the user and display the graphic object of which the size is changed. For example, when a distance between the electronic device 100 and the user is far, the graphic object 310 may be displayed large. When a distance between the electronic device 100 and the user is close, the graphic object 310 may be displayed small. In FIG. 3, the graphic object 310 is in the form of a character, but the graphic object may, of course, be represented as various shapes, such as design, a text, a picture, and the like.

The electronic device 100 may provide various services regarding a user's interaction. In this regard, the electronic device 100 may determine a state for providing a service, and display a graphic object with respect to the determined state.

TABLE 1

|  | Graphic Object | Background UI |
| --- | --- | --- |
|  | Initiate and ready | ○ |
| Ready | Like it is taking a rest or playing alone | ○ |
| Wake-up | Listening carefully | ○ |
| Voice Listening | Like it is listening carefully | ○ |
| Voice Processing | Like it is working hard | ○ |
| Voice Response | Display service according to template | ○ |
| Error | Like it is sorry | X |
| Gesture Processing | Like it is reacting to gesture | X |
| Audio Playing | Like it is talking | X |
| Sleep | — | X |
| Undocking | — | X |
| Android Notification | Inform | ○ |
| Motion Processing | Process look of face and posture (motion animation and the like) of 3D character | X |

As shown in Table 1 above, the electronic device 100 may have information about various states, and in each state, a graphic object may be operated in different motions. In addition, the electronic device 100 may display a function carried out by the electronic device 100 or the server 300 in each state as a graphic object so that the user may visually identify a processing process with respect to a user's interaction.

For example, the electronic device 100 may, in a docking state, generate a graphic object and display the generated graphic object. In a ready state in which the docking is complete and the interaction mode has been initiated, the electronic device 100 may display a graphic object which seems to be taking a rest or playing alone.

The wake-up state is a state in which a trigger for the electronic device 100 to carry out a service is input. In this regard, the trigger may be any one of a user's voice and a user's motion. When the trigger is a user's voice, the electronic device 100 may express a graphic object like it is listening to the user's voice carefully. When the trigger is a user's motion, the electronic device 100 may display a graphic object like it is watching the user's motion. In the voice listening state in which a user's voice for carrying out a service is input, the electronic device 100 may display a graphic object as if it were listening to the user's voice carefully. In the voice processing state for providing a service to a user by analyzing a user's voice, the electronic device 100 may display a graphic object as if the graphic object were working hard. In the voice response state which is a state for providing a service corresponding to the user's voice, the electronic device 100 may display the service according to a template. In the error state in which a service according to the user's voice has not been found, the electronic device 100 may display a graphic object as if the graphic object were sorry. In the gesture processing state for analyzing a user's motion, the electronic device may display a graphic object as if the graphic object is reacting to the user's motion. In the audio processing state in which an audio signal is output, the electronic device 100 may display a graphic object as if the graphic object is telling the output audio. In addition, the electronic device 100 may, of course, display an appropriate graphic object with respect to various states.

In addition, when a graphic object is displayed in the form of a character, the electronic device 100 may express emotions according to a user's interaction. That is, the electronic device 100 may determine user's emotion, and display a graphic object having various emotions according to the determined emotion. A graphic object may have various emotions, such as sadness, anger, fear, hatred/dislike, joy/excitement/self-confidence, surprise, happiness, love, expectation, greed, good feeling, affirmation, denial, embarrassment, shame, consolation/encouragement, upset, bored/tired, avoidance, and the like.

Figure 4A:
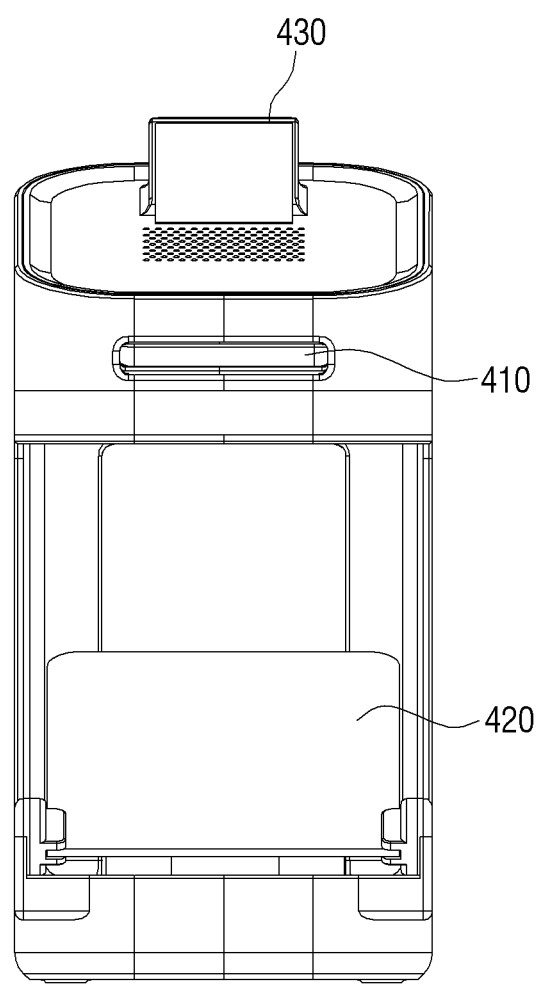
FIGS. 4A, 4B, and 4C are diagrams illustrating an example external device, according to various embodiments of the disclosure.
Figure 4B:
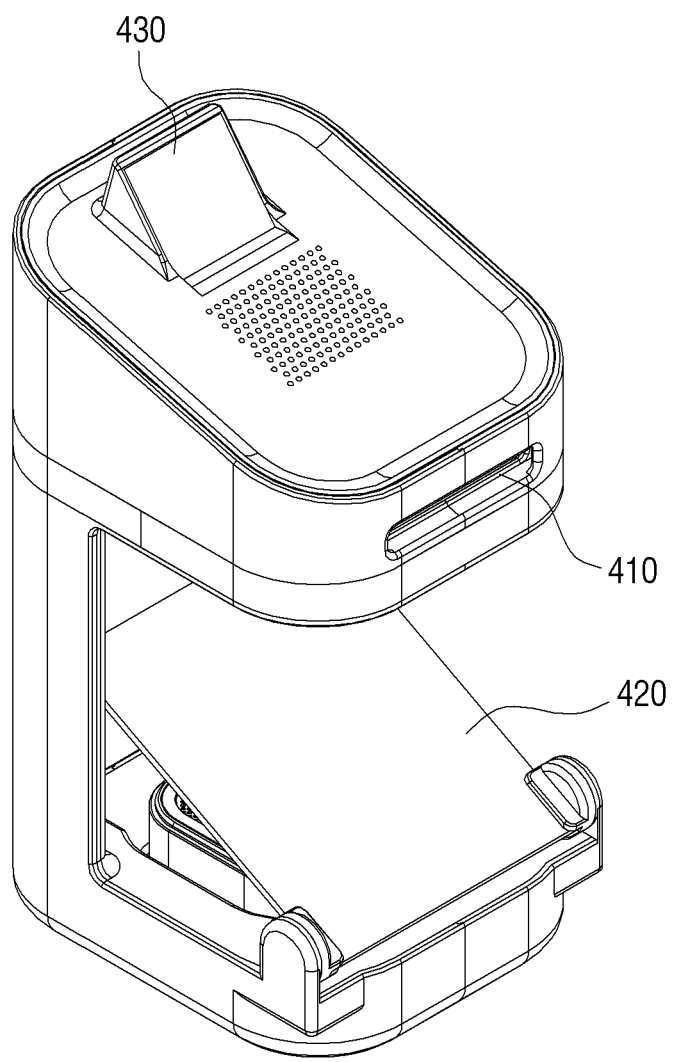
Figure 4C:
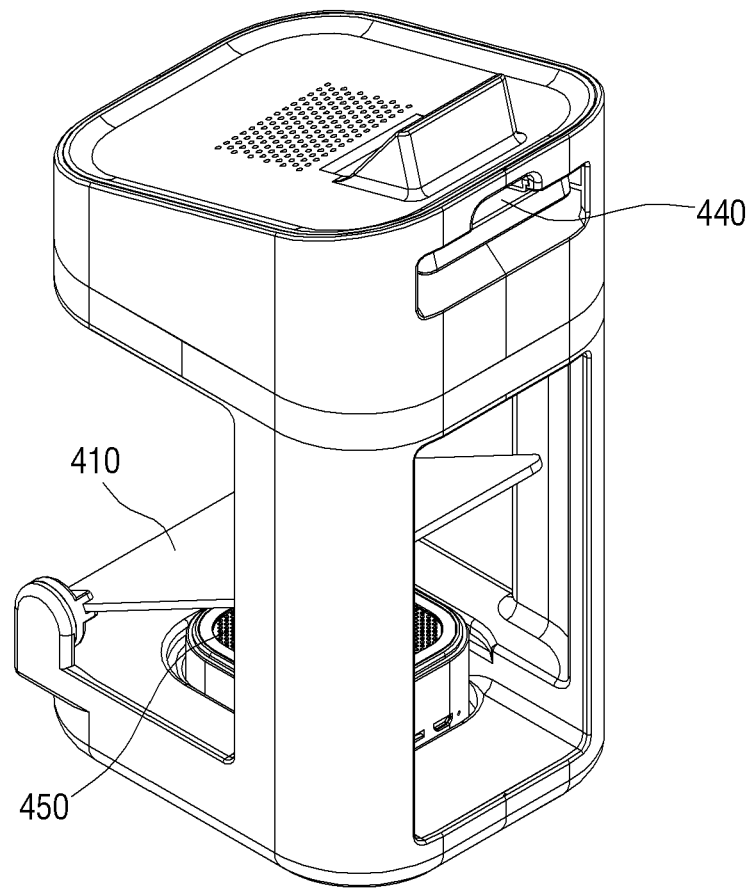

FIGS. 4A to 4C are diagrams illustrating an example external device, according to various embodiments of the disclosure.

Referring to FIGS. 4A to 4C, the external device 200 may process a graphic object 310 described with reference to FIG. 3 and provide the processed graphic object 310 to the user in various methods. For example, the graphic object 310 may be changed to a graphic object in a three dimensional (3D) shape or a graphic object in the form of a pseudo hologram and displayed.

As illustrated in FIG. 4A, the external device 200 may include an inputting part 410, a screen 420, and a first optical system 430, and may further include a background image acquisition unit 440 and a driver 450 as illustrated in FIG. 4C. Although not illustrated in FIGS. 4A to 4C, an external device may further include a second optical system.

The inputting part 410 is a configuration to be coupled with the electronic device 100. In more detail, the electronic device 100 may be inserted into the external device 200 via the inputting part 410. In this regard, the electronic device 100 may be inserted into the external device 200 so that the display 110 is directed toward the screen 420.

The screen 420 is a configuration for displaying a screen displayed on the display 110 of the electronic device 100 as a pseudo hologram in the 3D form. The screen 420 may be implemented as a special film which reflects an image displayed on the display 110. For example, the screen 420 may be implemented as a half-mirror film, a rear projection film, or the like, but is not limited thereto.

The first optical system 430 is a configuration for acquiring a background image behind the external device 200. In more detail, when the first camera of the electronic device 100 is implemented as being in the direction of the screen 420, the second camera may be implemented as being in the opposite direction to the first camera. Accordingly, the second camera is not capable of photograph a background image on the rear side of the external device 400, and may only photograph an image at the upper portion. Accordingly, the first optical system 430 is a configuration for changing a path of light so that the second camera acquires a background image on the rear side of the external device 200. The second camera may acquire a background image on the rear side of the external device 200 through the background image acquisition unit 440 and the first optical system.

Although not illustrated in FIGS. 4A to 4C, the second optical system is a configuration which is capable of adjusting a path of light so that the first camera can detect a user's position. The first optical system and the second optical system 430 may be modified according to positions of the first camera and the second camera.

The driver 450 may adjust a position of the screen 420. In more detail, the driver 450 may adjust a position of the screen 420 and change a position, size and the like of the graphic object displayed on the screen 420.

The external device 200 may further include various configurations as necessary in addition to the elements illustrated in FIGS. 4A to 4C. For example, the external device 200 may further include a wireless charger for wireless charging. In addition, the external device 200 may be configured as an electronic device including a processor for simple calculation processing.

Figure 5A:
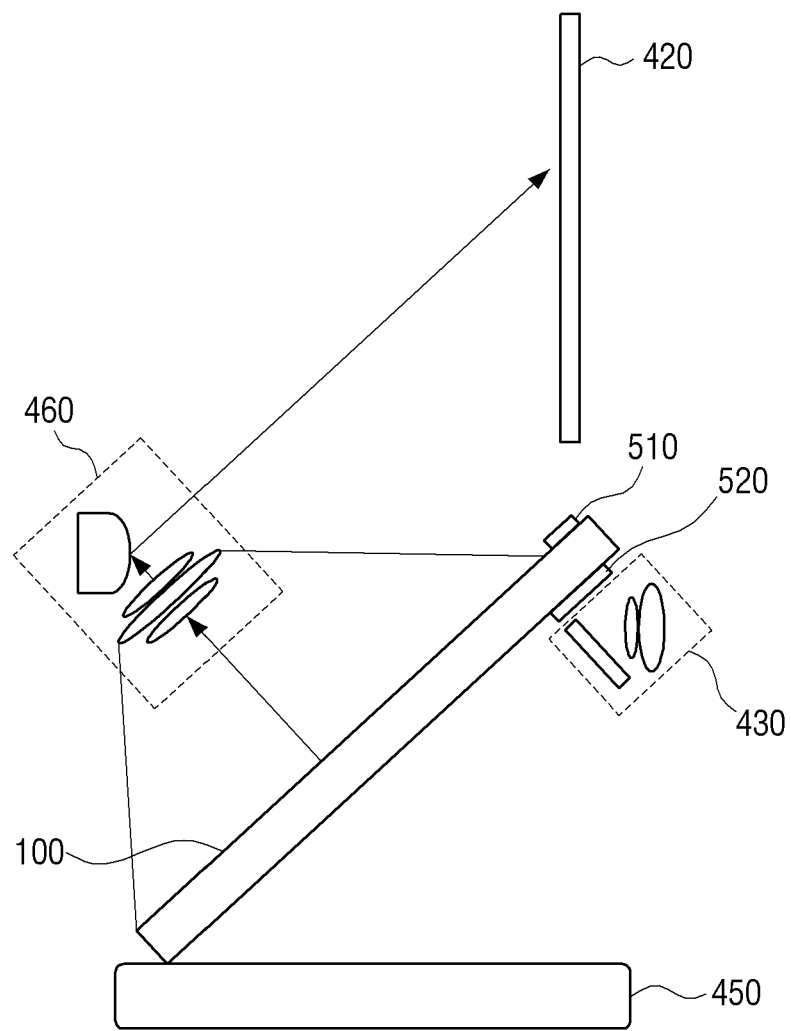
FIGS. 5A and 5B are diagrams illustrating a detailed example structure of an external device, according to various embodiments of the disclosure.
Figure 5B:
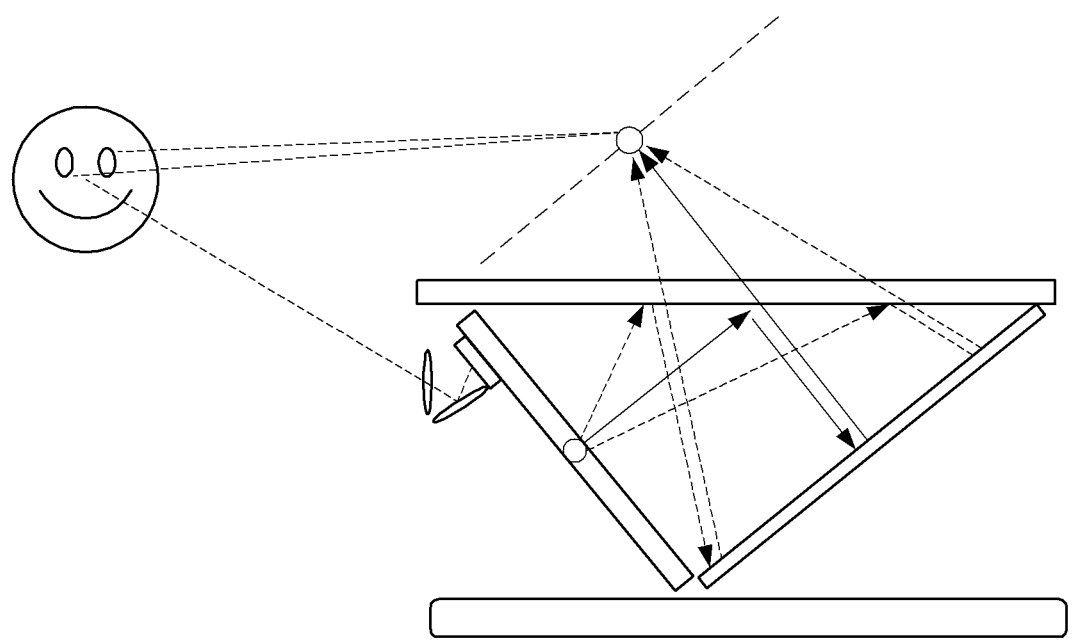

FIGS. 5A and 5B are diagrams illustrating a detailed example structure of an external device, according to an embodiments of the disclosure.

Referring to FIGS. 5A and 5B, for convenience of explanation, only some components of the electronic device 100 and the external device 200, or some components are enlarged or reduced, or positions of some components are differently disposed, and the example is not limited to the position and size illustrated in FIG. 5A.

In more detail, FIGS. 5A and 5B is a diagram illustrating an example configuration of a first camera 510, a second camera 520, a display 110, a screen 420 of an external device, a first optical system 430, a driver 450, and a second optical system.

As described above, the driver 450 is a configuration for adjusting a position of the electronic device 100 or the screen 420.

The first optical system 430 is a configuration for acquiring a background image on the rear side of the external device 200. In more detail, the first optical system 430 may include a wide-angle lens and an optical mirror. The first optical system 430 may, of course, be implemented to appropriately acquire a background image on the rear side of the external device 200 according to a disposition state of the second camera 520, a structure of the external device 200, and the like.

The second optical system is a configuration for enlarging or sharpening a graphic object projected onto the screen 420. The second optical system may, as well as the first optical system 430, be implemented using a wide-angle lens and an optical mirror. The second optical system may change a moving path of light so that the first camera 510 detects a user in front of the external device 200. In more detail, when a photographing direction of the first camera 520 is different from a front side direction of the external device 200, the first optical system may adjust a path of light and be implemented such that the first camera may photograph a front side direction of the external device 200. The second optical system may, of course, be implemented to appropriately acquire a front side of the external device 200 according to a disposition state of the first camera 510, a structure of the external device 200, and the like.

FIGS. 6A to 6E are diagrams illustrating a method for displaying a graphic object according to a background image, according to an embodiments of the disclosure.

Figure 6A:
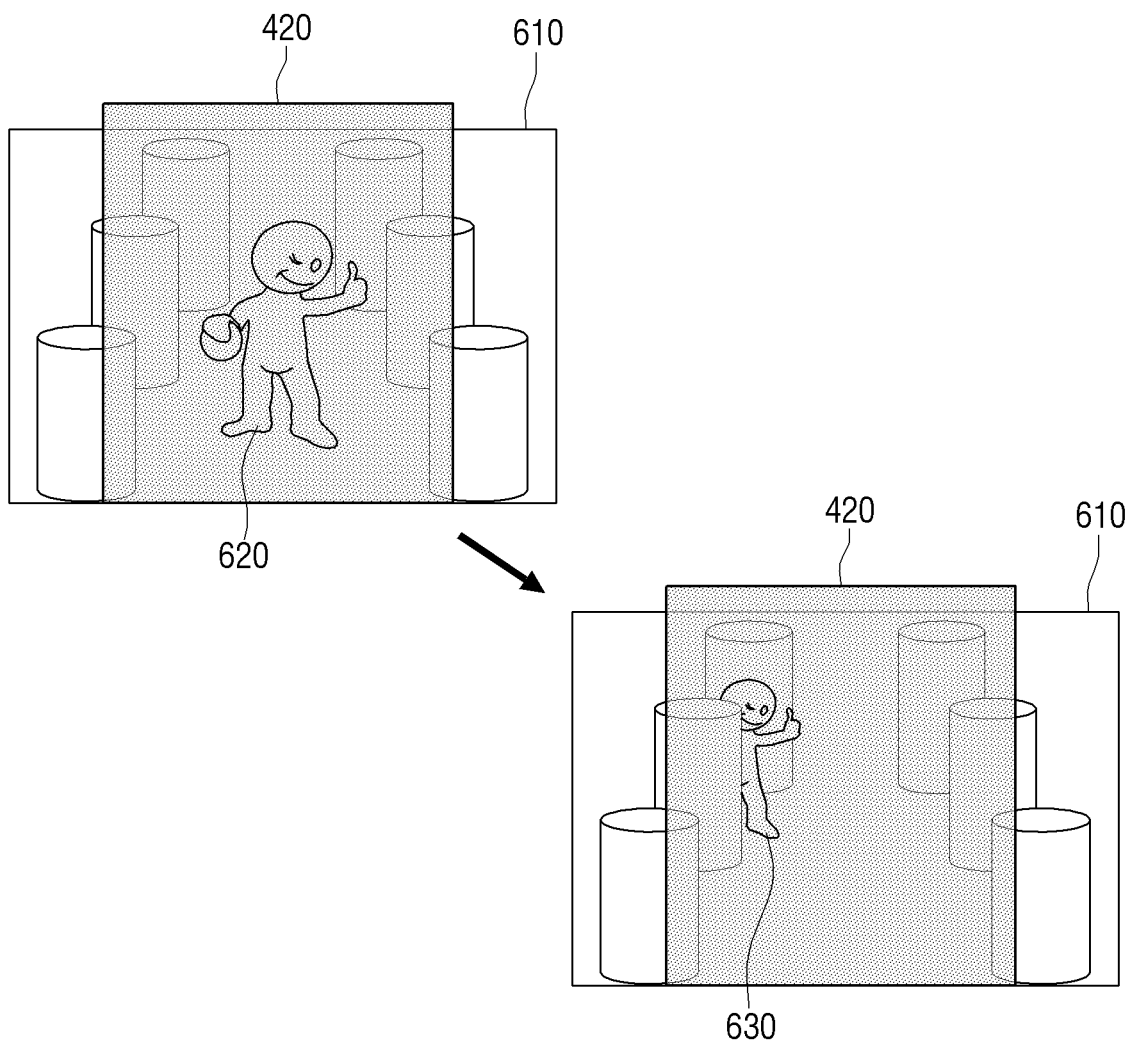
FIGS. 6A, 6B, 6C, 6D, and 6E are diagrams illustrating a method for displaying a graphic object according to a background image, according to various embodiments of the disclosure.

Referring to FIG. 6A, the screen 420 may be formed of a translucent material and thus, a graphic object 620, 630 may be displayed together with the background image 610 behind the screen. In this regard, the graphic object 620, 630 is displayed on the display 110 of the electronic device 100. However, the background image 610 not generated by the electronic device 100, but is an actual background image on the rear side of the external device 200. That is, the electronic device 100 photographs a background image through the second camera, but does not display the photographed background image on the display 110.

The electronic device 100 may display a graphic object based on information relating to a background image acquired through the second camera. That is, as illustrated in FIG. 6A, the electronic device 100 may display as if the graphic object 630 were positioned behind the pillar.

Figure 6B:
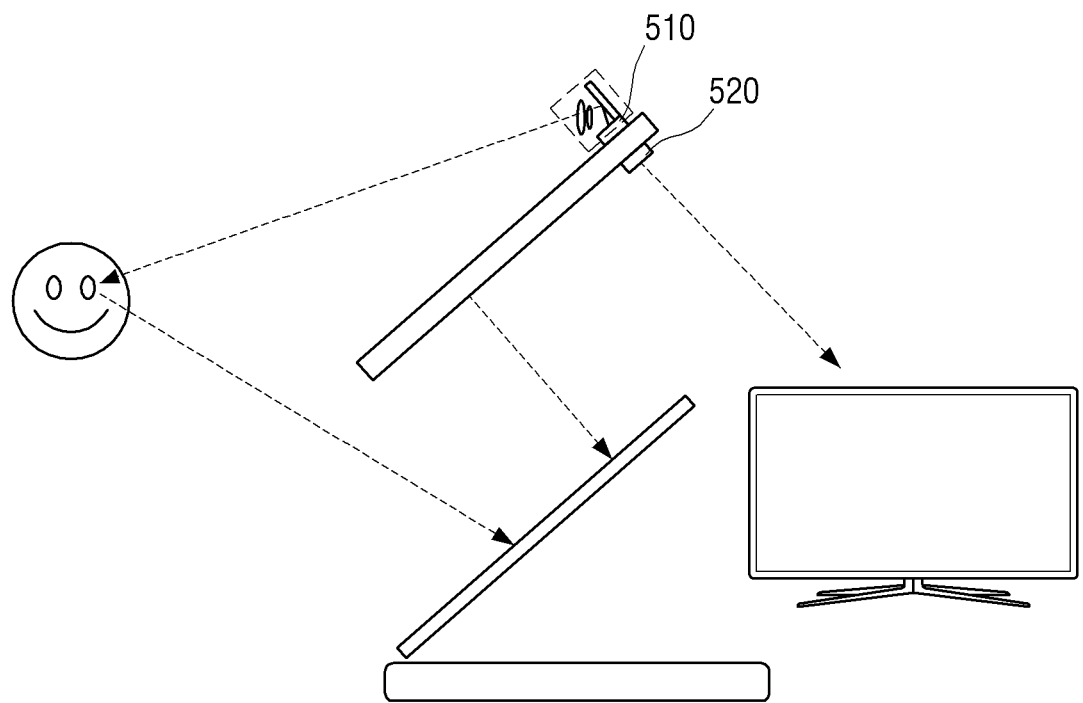

As described above, the background image may be an actual background image on the rear side of the external device 200, not an image displayed on the display 110 of the electronic device 100. That is, as illustrated in FIG. 6B, the second camera 520 photographs a background image but does not display the photographed background image on the display 110.

In more detail, when the second camera 520 photographs a background image, the electronic device 100 may analyze the photographed background image. In this regard, the electronic device 100 may analyze a position, distance, size and the like of an object present in the background image. The electronic device 100 may display a graphic object based on information relating to the position, distance, size and the like of the object which have been analyzed.

Figure 6C:
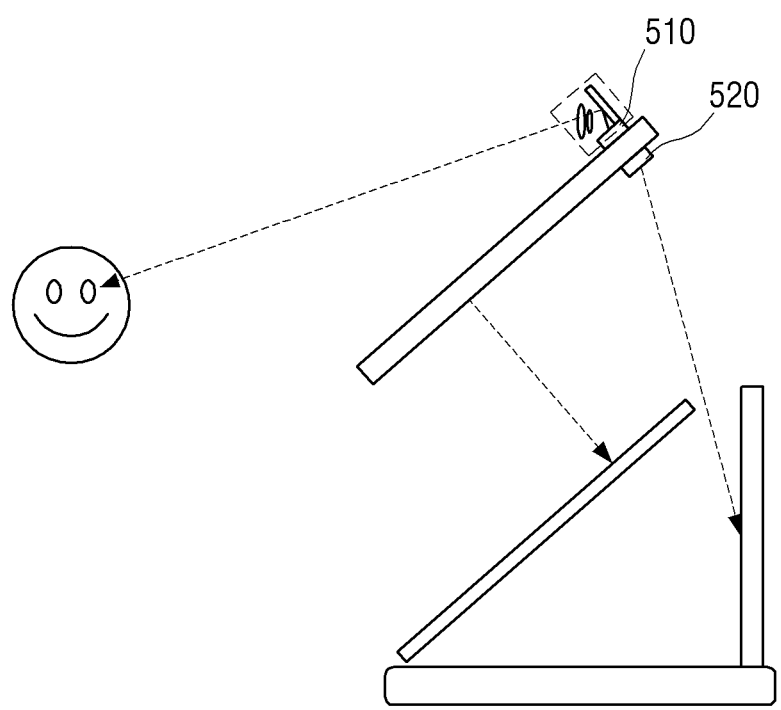
Figure 6D:
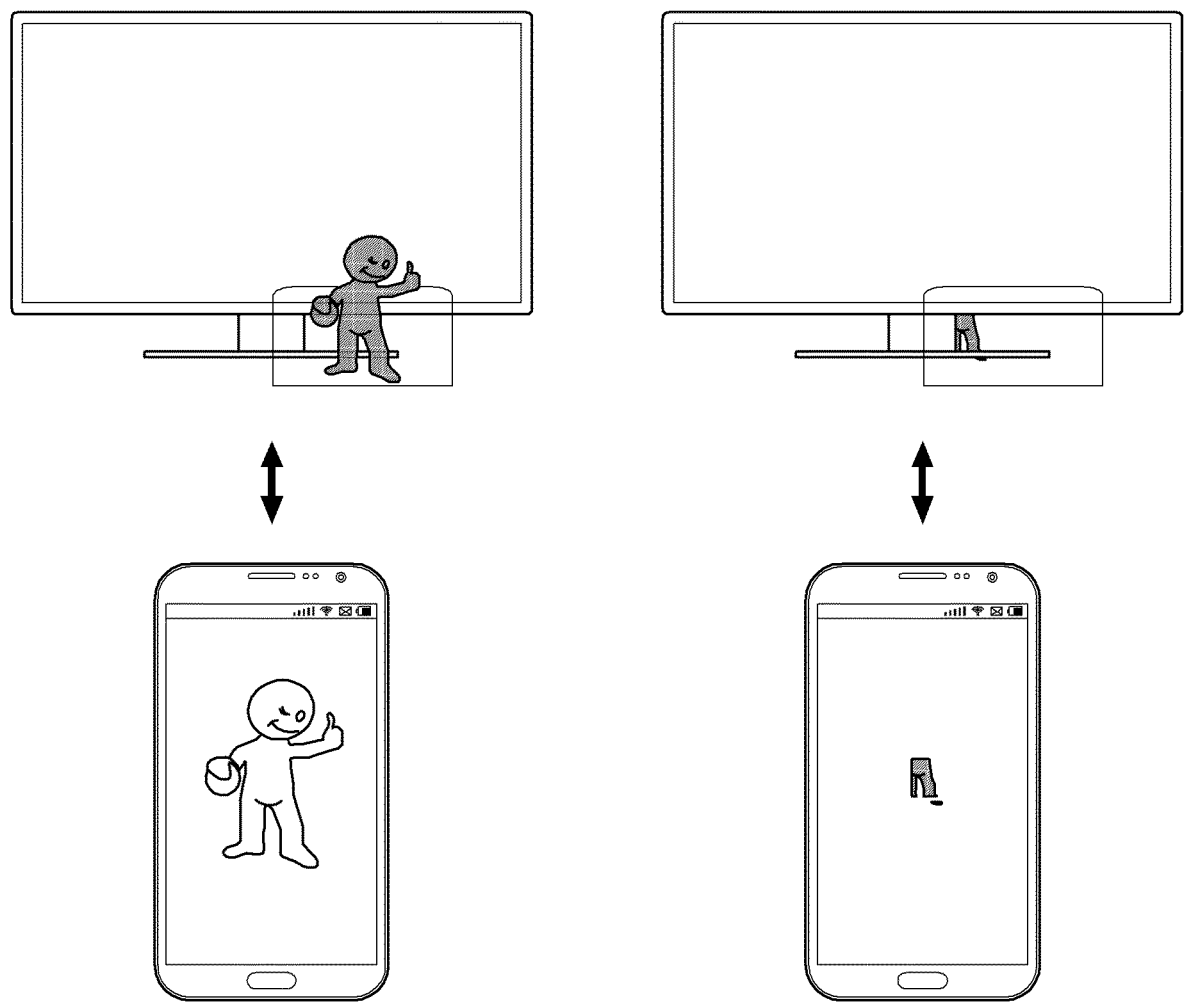

That is, as illustrated in FIG. 6D, when a display device is present behind the external device 200, the electronic device 100 may associate a graphic object with the display device and display it. That is, as illustrated on the left side of FIG. 6D, a graphic object may be displayed in front of the display device. In this regard, the entire graphic object will be displayed. Meanwhile, as illustrated on the right side of FIG. 6D, the graphic object may be displayed as being hidden behind the display device. In this regard, the graphic object may be displayed other than a portion hidden by the display apparatus.

As illustrated in FIG. 6C, the electronic device 100 may not photograph a background of the rear side of the external device, but may acquire an image of a pre-manufactured background card and display a graphic object based on the acquired background card image. In this regard, the pre-stored background card may be a background card which stores a background image of various types.

Figure 6E:
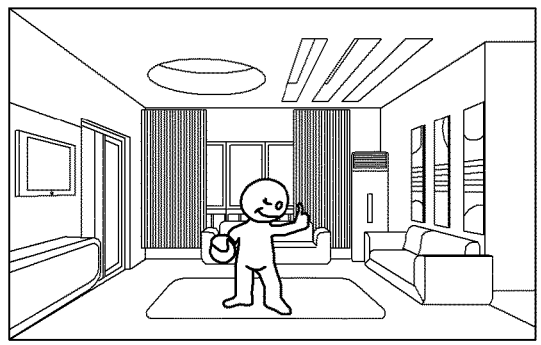
Figure 6E:
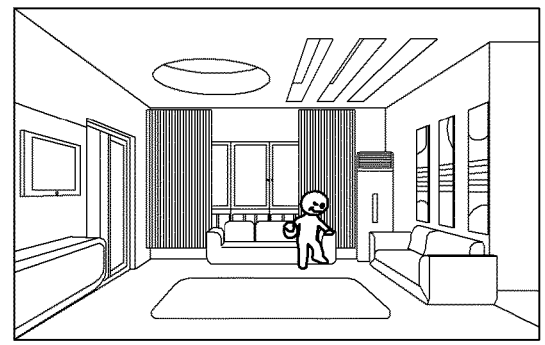

The electronic device 100 may acquire an image of a background card itself using a second camera, but the example is not limited thereto. For example, the background card may include marking information, such as a quick response (QR) code, a barcode, and the like. In this regard, the electronic device 100 may receive data relating to a background image through the marking information, such as a QR code, a barcode, and the like of the background card. The electronic device 100 may display a graphic object based on the received data. That is, as illustrated in FIG. 6E, the electronic device 100 may analyze an image of a background card, and display the graphic object in the form that the graphic object is standing in a living room or that the graphic object is sitting on a sofa.

Figure 7A:
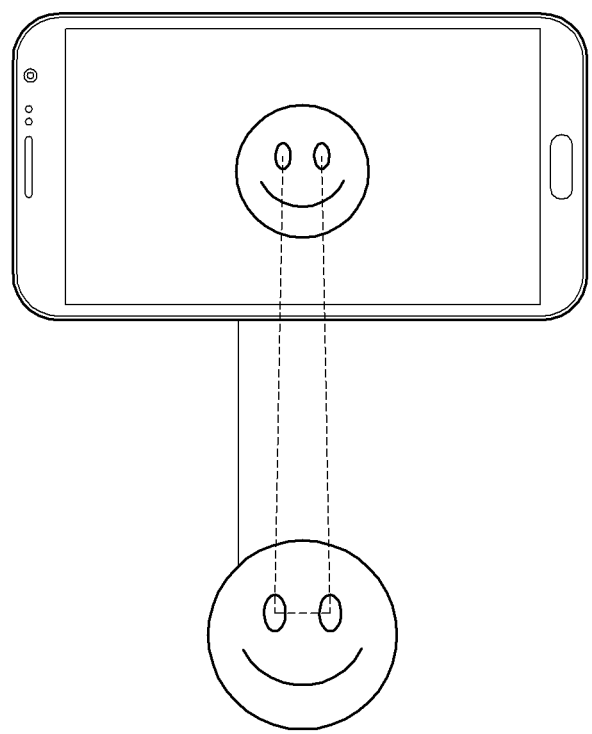
FIGS. 7A and 7B are diagrams illustrating an example method for determining a position of a user and an example method for displaying a graphic object according to the position of the user, according to various embodiments of the disclosure.
Figure 7B:
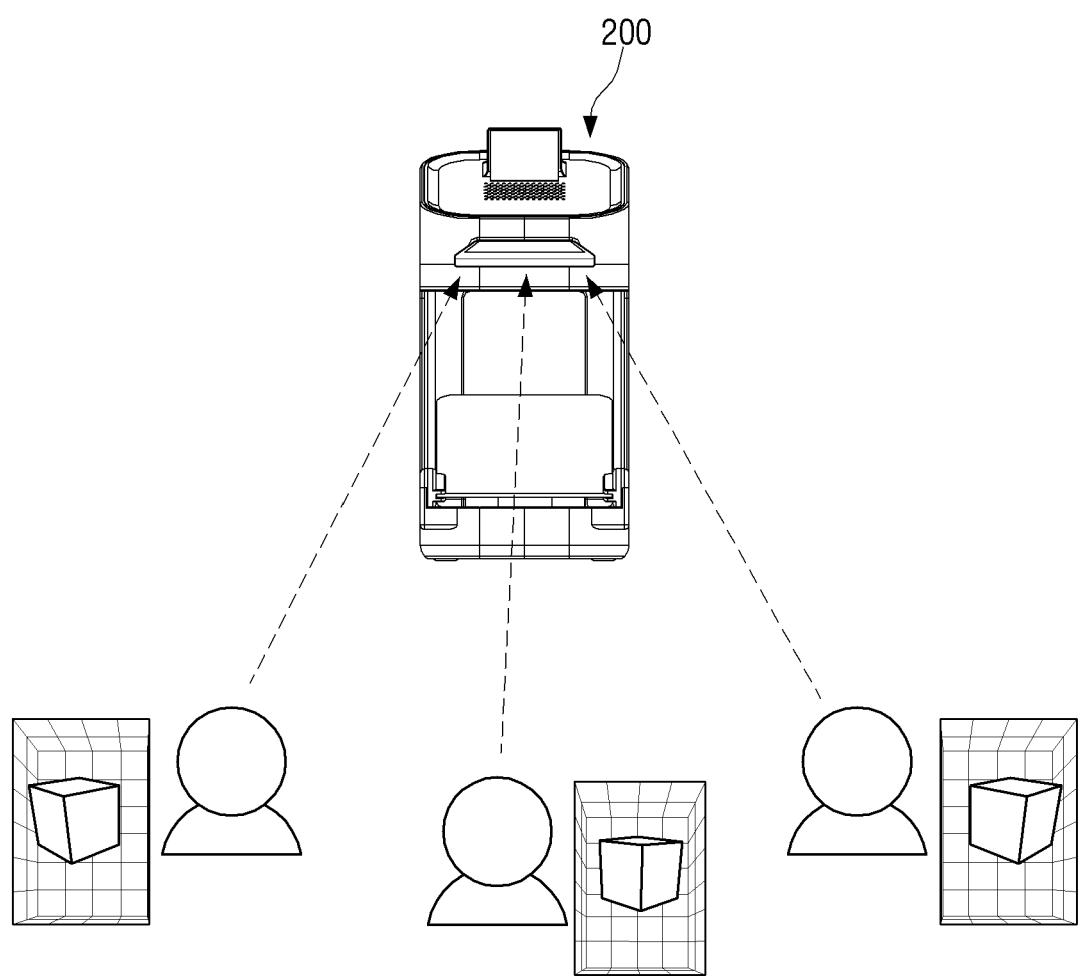

FIGS. 7A and 7B are diagrams illustrating an example method for determining a position of a user and an example method for displaying a graphic object according to the position of the user, according to various embodiments of the disclosure.

Referring to FIG. 7A, the electronic device 100 may acquire an image of a user captured from a predetermined distance, and acquire distance information between both eyes of the user on the photographed user image. In addition, the electronic device 100 may store an actual distance between both eyes of the user. That is, the electronic device 100 may determine a distance between the electronic device 100 and the user by using a predetermined distance, an actual distance between both eyes of the user, and distance information between both eyes of the user on the user image.

Meanwhile, the electronic device 100 may differently display a graphic object on the background image according to a user's position. In an example embodiment, when a background image is implemented as a background card, the electronic device 10 may acquire background card information and acquire a 3D coordinate information including depth information of the background card image. In this regard, the background card information may be acquired by the second camera as described above, or may be acquired from a QR code, barcode, and the like of the background card.

When a user's position is changed, or it is necessary to change a position of a graphic object, the electronic device 100 may change a position of the graphic object based on the acquired 3D coordinate system. In more detail, the electronic device 100 may recognize a user's face and user's eyes through a camera, and determine a position of the user using the recognized user's face and the recognized user's eyes. That is, the electronic device 100 may convert the recognized user's face and the recognized user's eyes to a 3D space coordinate system, determine a user's position based on the converted value, and display a graphic object based on the determined user's position. That is, as illustrated in FIG. 6A, the graphic object may be expressed in perspective, such as looking closer or farther. In addition, a graphic object may be combined with the background image, such as the graphic object being displayed behind the object on the background image.

The graphic object may be differently displayed according to a user's position. For example, as illustrated in FIG. 7B, it may be assumed that a graphic object is a hexahedron. In this regard, when the user is present on the left side of the external device 200, the graphic object may be disposed such that one side of the hexahedron is visible from the user or the hexahedron is slightly inclined to the left side. Likewise, when the user is present on the right side of the external device 200, the graphic object may be disposed such that one side of the hexahedron is visible from the user or the hexahedron is slightly inclined to the left side.

Hereinabove, a method for displaying a graphic object by the electronic device 100 and the external device 200 coupled with the electronic device is described. Hereinafter, various example embodiments combined with the graphic object displayed in this way will be described in greater detail.

Figure 8:
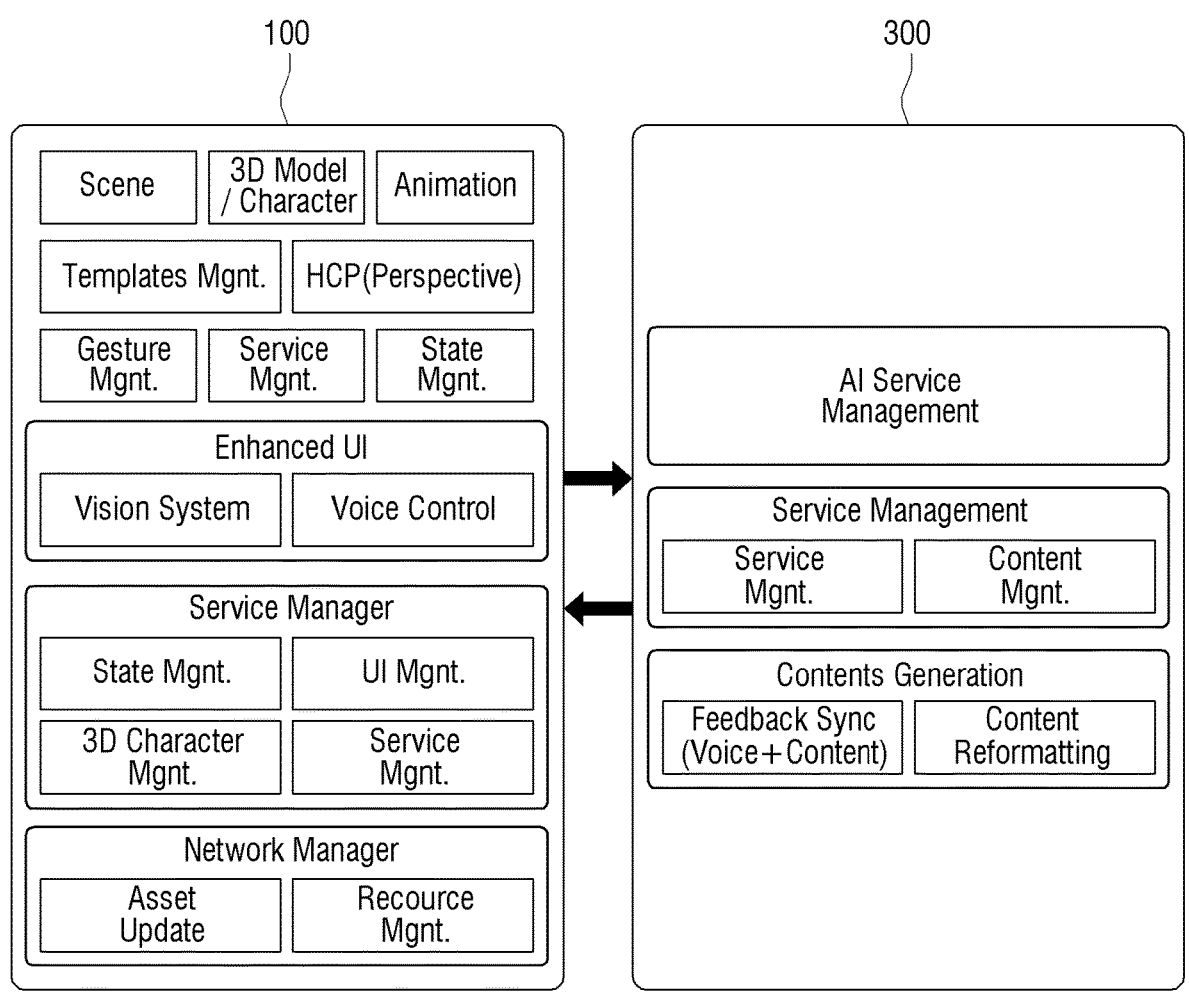
FIG. 8 is a diagram illustrating an example software module of an electronic device and a server, according to an example embodiment.

FIG. 8 is a diagram illustrating an example software module of an electronic device and a server, according to an embodiment of the disclosure.

Referring to FIG. 8, only the electronic device 100 and the server 300 are illustrated, but the electronic device 100 may, of course, be an external device 200 coupled with the electronic device 100. In addition, the software module illustrated in FIG. 8 may, of course, be configured in the form of hardware.

The electronic device 100 may include various modules for displaying a graphic object. In more detail, the electronic device 100 may include a scene module, a 3D character module, an animation module, a template management module, a head-coupled perspective (HCP) module, a gesture management module, a service management module, a state management module, an enhanced UI module, a service manager module, and a network manager module.

The scene module, the 3D character module, and the animation module are configurations for managing a resource. The scene module may manage both an image including a 3D background and an image not including a 3D background.

The service management module may receive a content configured appropriately to a user's intention, load a configuration of a template corresponding to the received information, and display the corresponding information in the form of a predetermined layout on the template. In this regard, the template may include information about a background image, a graphic object and an object of the background image.

The state management module is a configuration for receiving state information and controlling a graphic object, and further displaying a background image if necessary. A background image displayed by the state management module is a background image to be further displayed by the electronic device, not the above-described actual background image or the image of the background card.

The gesture management module is a configuration for receiving a gesture UI command generated based on gesture information of the user and carrying out a function corresponding to the received gesture UI command.

The template management module is a configuration for analyzing content information received by the service management module and configuring a template. A template configured by the template management module may, for example, be a screen conversion animation template provided for each service and a 3D template according to a content type, such as informing, weather, video, music and the like. The template may be changed according to a user's gesture, or may be changed according to a background image that is displayed. In an example embodiment, a template may be of various shapes as illustrated in FIGS. 9A to 9D. In more detail, a template may be in a form in which only a graphic object expressed as a 3D character is displayed. In addition, a template may be in a form in which a graphic object expressed as a 3D character and a content are displayed together, or may be in a form of a card list in which a graphic object expressed as a 3D character and a text/image are displayed together. In addition, a template may be in a form in which only a content, a text and an image are displayed without a graphic object expressed as a 3D character. In addition, a template may be in a form in which a content, a text and an image are overlapped with a graphic object expressed as a 3D character.

Referring again to FIG. 8, the HCP module is a configuration for differently displaying a graphic object according to a user's position as illustrated in FIG. 7B. When a user input to activate the HCP module is received, the electronic device 100 may activate the HCP module and differently display a graphic object according to a user's position. In this regard, when a user's position is changed, the HCP module may receive the user's changed position information and display a content in off-axis-perspective.

The service manager module is a configuration for controlling various services.

The network manager module is a configuration for communicating with the server 300 or a third party service server. The network manager module may support HTTP 1.x, HTTP 2.x support (including secure sockets layer (SSL)/transport security layer (TLS)), OAuth 2.X, and the like.

The enhanced UI module is a configuration for recognizing a user's voice or a user's gesture. In more detail, the enhanced UI module may include a vision system module and a voice recognition module. The vision system module may recognize a user's motion and a user's gesture by analyzing an image input through a camera, and transmit the recognized user's motion and the recognized user's gesture to the gesture management module. The vision system module may analyze the recognized user's motion and the recognized user's gesture based on a result of content analysis of the service manager module. The voice recognition module may recognize a user's voice. In addition, the voice recognition module may recognize an initiation instruction for initiating an interaction mode and initiate the interaction mode.

The server 300 may include an A service management module, a service management module, and a contents generation module.

The AI service management module is a configuration for analyzing the input data when an AI service is used. For example, the A service management module may analyze a user's intention by using an automatic speech analysis (ASR), a natural language understanding (NLU), a text to speech (TTS), and the like, and may transmit the analyzed intention to the service management module.

The service management module may analyze the received user's intention and acquire a content corresponding to the user's intention. In addition, the service management module may manage the overall service.

The contents generation module is a configuration for acquiring a content corresponding to a user's intention in a template of an appropriate form for the electronic device 100 and a service executed by the electronic device 100. Further, the contents generation module may dispose metadata corresponding to the content according to a configuration of the acquired template. In an example embodiment, the metadata may be transferred in the form of JavaScript Open Notation (JSON) to the electronic device 100.

Meanwhile, the server 300 may analyze data received from the electronic device 100 and determine a service corresponding to the analysis result. In this regard, the data received from the electronic device 100 may a user voice data or a user motion data.

In an example embodiment, the server 300 may receive audio data including user voice data from the electronic device 100. The server 300 may acquire user voice data by processing the received audio data and analyze the acquired user voice data. However, the function of acquiring the user voice data from the audio data may, of course, be carried out by the electronic device 100. In this regard, the server 300 may receive user voice data acquired from the audio data from the electronic device 100.

When the user voice data is acquired, the A service management module may analyze the user voice data to analyze a user's intention included in the user voice data, and acquire a service corresponding to the user's intention. In this regard, the acquired service may be various services, such as a service related to providing a content, a service related to informing, and the like.

When a service corresponding to the user's intention is acquired, the server 300 may determine a template corresponding to the acquired service. The determination of the template corresponding to the service may be made by the AI service management module, but is not limited thereto. That is, the A service management module may determine a pre-stored template corresponding to the acquired service by using a learned AI model, deform a pre-stored template and acquire a template similar to the pre-stored template, or acquire a new template corresponding to the acquired service. However, the server 300 may, of course, determine a pre-stored template corresponding to a service acquired by a general processor not using an AI model.

The server 300 may add data relating to the acquired service to the determined template and transmit it to the electronic device 100, and the electronic device 100 may display the received template according to a predetermined layout.

In another example embodiment, the server 300 may receive image data including user data from the electronic device 100. The server 300 may analyze the image data and acquire user data. In this regard, the user data may be data related to a user's gesture, data related to a user's position, face data of the user, and the like. As described above, the function of acquiring the user data from the image data may, of course, be carried out by the electronic device 100. In this regard, the server 300 may receive user data acquired from the image data from the electronic device 100.

When the user data is acquired, the A service management module may analyze the user data to analyze a user's intention included in the user data, and acquire a service corresponding to the user's intention. In this regard, the acquired service may be various services, such as a service related to providing a content, a service related to informing, and the like.

When a service corresponding to the user's intention is acquired, the server 300 may determine a template corresponding to the acquired service. The determination of the template corresponding to the service may be made by the AI service management module, but is not limited thereto. That is, the A service management module may determine a pre-stored template corresponding to the acquired service by using a learned AI model, deform a pre-stored template and acquire a template similar to the pre-stored template, or acquire a new template corresponding to the acquired service. However, the server 300 may, of course, determine a pre-stored template corresponding to a service acquired by a general processor not using an AI model.

The server 300 may add data relating to the acquired service to the determined template and transmit it to the electronic device 100, and the electronic device 100 may display the received template according to a predetermined layout.

In another example embodiment, the server 300 may analyze the acquired user face data or the acquired user voice data and determine an emotion state of the user. In more detail, the AI service management module may determine a user's emotion by analyzing the user face data and the user voice data, and acquire a service according to the determined user's emotion. For example, when a user's voice "Recommend song" and a user face data uttering "Recommend song" are acquired, the server 300 may analyze an emotion state of the user and provide music corresponding to the analyzed user's emotion. As another example, the server 300 may generate information relating to a graphic object corresponding to an emotional state of the user and transmit the generated information to the electronic device 100. That is, if the user's emotion is "sadness," the server may generate information relating to a 3D character (graphic object) in a sad state and transmit the generated information to the electronic device 100, and the electronic device 100 may express the 3D character (graphic object) in a sad state. In addition, the electronic device 100 may output not only a 3D character (graphic object) in a sad state and but also audio data in a sad state. As described above, the user's emotion determined by the AI service management module or the emotion of a graphic object (or emotion of the audio data) expressed by the A service management module may be of various emotions, such as sadness, anger, fear, hatred/dislike, joy/excitement/self-confidence, surprise, happiness, love, expectation, greed, good feeling, affirmation, denial, embarrassment, shame, consolation/encouragement, upset, bored/tired, avoidance, and the like. Meanwhile, the various example embodiments described above may not be applied independently of each other but may, of course, be applied in combination.

FIGS. 9A to 9D are diagrams illustrating an example method for displaying various graphic objects, according to an embodiments of the disclosure.

Figure 9A:
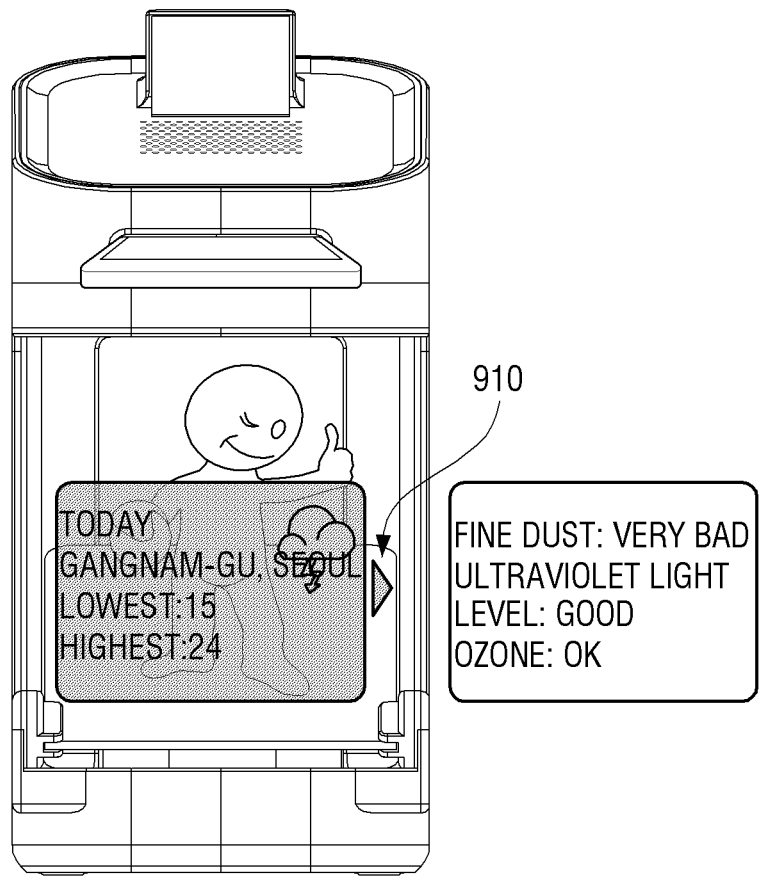
Figure 9B:
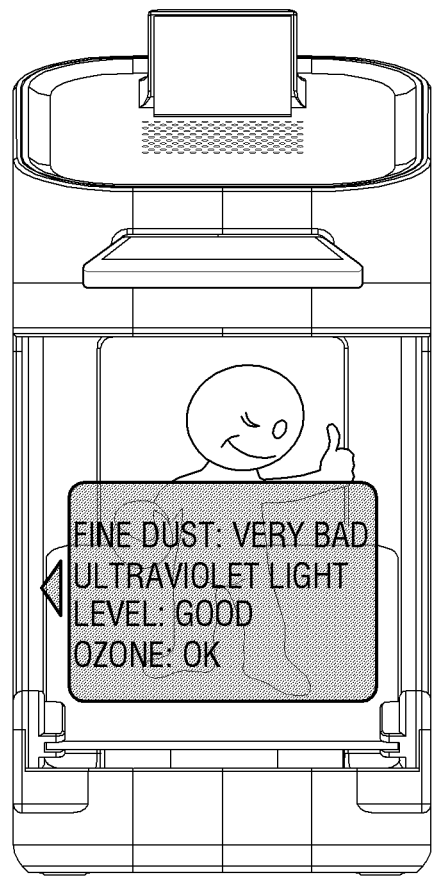

Referring to FIGS. 9A and 9B, the electronic device 100 and the external device 200 may display a graphic object and a UI according to a user command to inquire about weather information.

In this regard, as illustrated in FIG. 9A, when the amount of information to be displayed is large, the electronic device 100 may further display a guide UI 910 informing that a UI relating to additional information is present. When a user command through the guide UI is input, the electronic device 100 may display additional information as illustrated in FIG. 9B. When the additional information as illustrated in FIG. 9B is displayed, a guide UI for redisplaying the previously-displayed information may be displayed together with the additional information. When the additional information through the guide UI is input, the electronic device 100 may, of course, redisplay the previous information as illustrated in FIG. 9A.

Meanwhile, a user command through the guide UI 910 may be of various forms. For example, a user command may be a voice command. In a state in which a graphic object and a UI are displayed as illustrated in FIG. 9A, when a user voice, such as "Next," is input, the electronic device 100 may display the graphic object and the UI according to the user voice as illustrated in FIG. 9B. Alternatively, a user command may be a gesture command. In a state in which a graphic object and a UI are displayed as illustrated in FIG.

9A, when a user voice, such as a gesture to wave hand to the right side, is input, the electronic device 100 may display the graphic object and the UI according to the user gesture as illustrated in FIG. 9B. Alternatively, a user command may, of course, be a command through a remote control device.

Figure 9C:
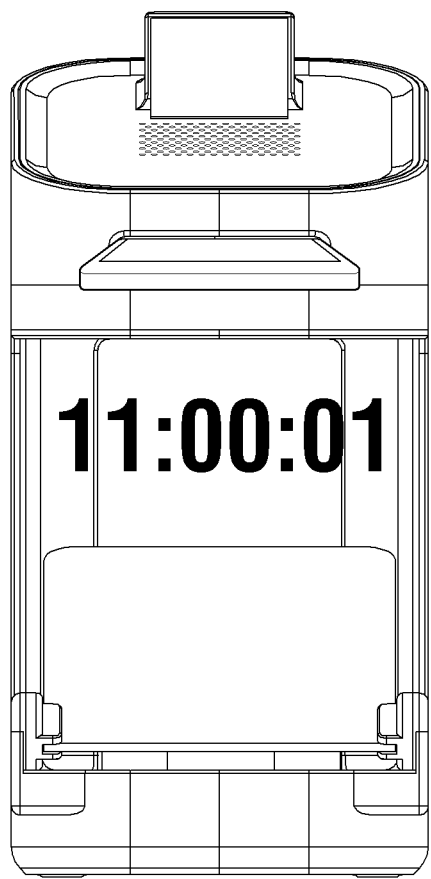

As illustrated in FIG. 9C, the electronic device 100 may not display a graphic object but may, of course, display only a UI for informing. In this regard, when a user command for displaying a graphic object is input, the electronic device 100 may display a UI for informing together with a graphic object.

FIG. 9D is a diagram provided to explain various service providing examples, according to an embodiment of the disclosure.

As illustrated in FIG. 9D, the electronic device 100 may provide various services according to a user's interaction. For example, when a user's interaction for displaying a graphic object is input, the electronic device 100 may display a graphic object. In addition, when a user's interaction inquiring about weather information is input, the electronic device 100 may display a UI (text information or image information may be included) with respect to today's weather. In addition, when a user's interaction for music recommendation is input, the electronic device 100 may display a UI for music recommendation. In addition, the electronic device 100 may display a music video, concert video clip, and the like according to a user's interaction requesting to show a music-related content. In addition, when a user command for recommending a particular product, the electronic device 100 may display a product image and product information.

Hereinafter, with reference to FIGS. 10, 11, 12, and 13, a method of, after generating a data recognition model using a learning algorithm, determining various services according to a user's interaction through the data recognition model or determining a graphic object according to a user's interaction according to various embodiments of the disclosure will be described. In this regard, the electronic device 100 may, of course, be in a state of being coupled with the external device 200.

Figure 10:
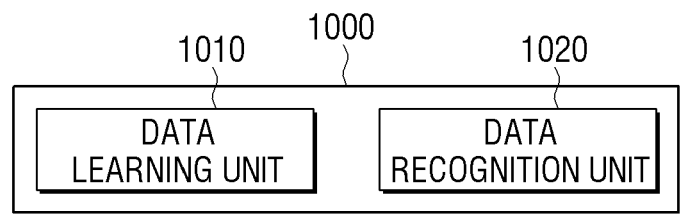
FIGS. 10, 11, 12, and 13 are diagrams illustrating an example embodiment of constructing a data recognition model through a learning algorithm and recognizing data, according to various embodiments of the disclosure.

FIG. 10 is a diagram illustrating an example embodiment of constructing a data recognition model through a learning algorithm and recognizing data, according to an embodiment of the disclosure.

Referring to FIG. 10, the processor 1000 according to some embodiments may include a data learning unit 1010 and a data recognition unit 1020.

The data learning unit 1010 may generate or train a data recognition model so that the data recognition model has a criterion for a service to be provided by the data recognition model or a determination of user's emotion (e.g., determination of a user's interaction and a service according to the user's interaction and determination of user's emotion regarding the user's interaction). To determine a service to be provided or user's emotion, the data learning unit 1010 may generate a data recognition model having a criterion for determination by applying learning data to a data recognition model.

For example, according to an example embodiment, the data learning unit 1010 may generate or train the data recognition model by using learning data related to voice information and learning data related to image information.

The data recognition unit 1020 may determine a service to be provided or user's emotion based on the recognition data. The data recognition unit 1020 may, using the trained data recognition model, determine a service to be provided or user's emotion from predetermined recognition data. The data recognition model 1020 may acquire predetermined recognition model according to a predetermined standard and apply the acquired recognition data as input value to the data recognition model, to thereby determine (or estimate) a service to be provided or user's emotion based on the predetermined recognition data.

In addition, an output value output by applying the acquired recognition data as an input value to the data recognition model may be used to update the data recognition model.

In particular, according to an example embodiment, the data recognition unit 1020 may apply recognition data related to voice information and recognition data related to image information as input values to the data recognition model to determine a provided service according to the recognition data.

In addition, the data recognition unit 1020 may determine the recognition data related to voice information and recognition data related to image information as information related to user's emotion.

At least a portion of the data learning unit 1010 and at least a portion of the data recognition unit 1020 may be implemented as a software module or manufactured in the form of at least one hardware, and mounted in the electronic device. For example, at least one of the data learning unit 1010 and the data recognition unit 1020 may be manufactured in the form of an exclusive hardware chip for AI, or may be manufactured as a portion of the previous general processor (e.g., CPU or application processor (AP)) or a graphic exclusive processor (e.g., graphics processing unit (GPU)), and mounted in the various electronic devices described above. In this regard, the exclusive hardware chip for AI may be an exclusive processor which is specialized in probability operation, and may show a higher performance compared with the previous general processor so as to facilitate processing of a computing operation in the field of AI such as machine learning. When the data learning unit 1010 and the data recognition unit 1020 is implemented as a software module (or a program module including a supervised), the software module may be stored in non-transitory computer readable media. In this regard, a software module may be provided by an OS or a predetermined application. Alternatively, part of the software module may be provided by an OS, and some of the at least one software module may be provided by a predetermined application.

In this case, the data learning unit 1010 and the data recognition unit 1020 may be mounted on one electronic device or on separate electronic devices, respectively. For example, one of the data learning unit 1010 and the data recognition unit 1020 may be included in the electronic device 100, and the other may be included in an external server. The data learning unit 1010 and the data recognition unit 1020 may provide the model information constructed by the data learning unit 1010 to the data recognition unit 1020 or the data input to the data recognition unit 1020 may be provided to the data learning unit 1010 as additional learning data via wire or wirelessly.

Figure 11:
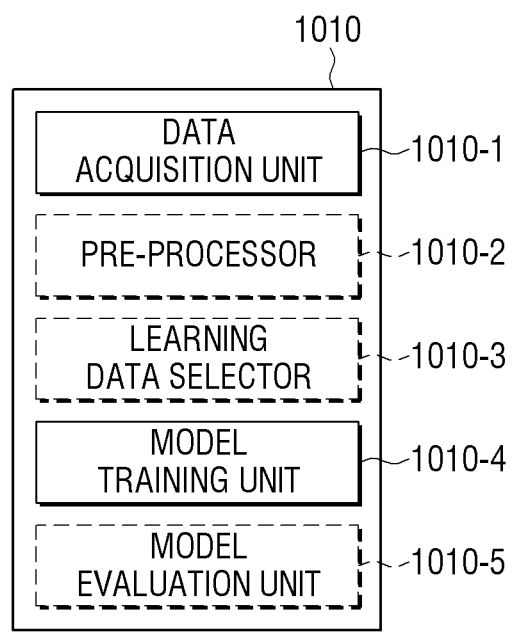

FIG. 11 is a block diagram of a data learning unit, according to an embodiment of the disclosure.

Referring to FIG. 11, the data recognition unit 1010 according to some example embodiments may include a data acquisition unit 1010-1 and a model training unit 1010-4. In addition, the data learning unit 1010 may further selectively include at least one of a pre-processor 1010-2, a learning data selector 1010-3, and a model evaluation unit 1010-5.

The data acquisition unit 1010-1 may acquire learning data necessary for learning for determining user's emotion.

For the learning data, data which is collected or tested by the data learning unit 1010 or the manufacturer of the electronic device 1010 may be used. Alternatively, the learning data may include voice data generated from a natural language uttered by the user via a microphone. Alternatively, the learning data may include image data in which the user is captured by a camera. In this case, the microphone and the camera may be provided inside the electronic device 100, but this is only an example, and voice data for a natural language acquired through an external microphone and image data for the action acquired through a camera may be used as learning data. The model training unit 1010-4 may train a data recognition model by using the learning data so that the data recognition model has a criterion for determination of a service or user's emotion. For example, the model training unit 1010-4 may train a data recognition model through supervised learning using at least a portion of the learning data as a criterion for identification. In addition, the model training unit 1010-4 may train itself using a learning data without additional instructions and train a data recognition model through unsupervised learning which discovers an identification criterion for determining a service to be provided or user's emotion.

In addition, the model training unit 1010-4 may learn a criterion for selection as to which learning data should be used to determine a service or user's emotion.

In particular, according to an example embodiment, the model training unit 1010-4 may generate or train the data recognition model by using learning data related to voice information and learning data related to image information. In this regard, when the data recognition model is trained through a supervised training scheme, as determination criteria, a service according to a user's interaction and user's emotion for the user's interaction may be added as training data.

Meanwhile, the data recognition model may be a model which is built in advance and updated by the training of the model training unit 1010-4. In this regard, the data recognition model may have received an input of basic learning data (e.g., a sample image and the like) and is in a pre-built state.

The data recognition model may be constructed considering the application field of the recognition model, the purpose of learning, or the computer performance of the device. The data recognition model may be, for example, a model based on a neural network. The data recognition model may be designed to simulate a structure of human brain on the computer. The data recognition model may include a plurality of network nodes having a weighted value which simultaneous neurons of a human neural network. Each of the plurality of network nodes may form a connection relationship so that neurons simulate a synaptic activity exchanging signals through synapse. The data recognition model may, for example, include a neuron network model or a deep learning model which is advanced from the neuron network model. A plurality of network nodes in the deep learning model may be positioned at different depths (or layers) from each other, and may exchange data according to a convolution connection relationship.

For example, a model such as deep neural network (DNN), recurrent neural network (RNN), and bidirectional recurrent deep neural network (BDNR) may be used as a data recognition model, but the disclosure is not limited thereto.

According to various embodiments, the model training unit 1010-4 may be a data recognition model for learning a data recognition model in which the input learning data and the basic learning data are highly relevant, when a plurality of pre-built data recognition models are present. In this case, the basic learning data may be pre-classified according to a data type, and the data recognition model may be pre-built for each data type. For example, the basic learning data may be pre-classified by various criteria such as an area where the learning data is generated, a time at which the learning data is generated, a size of the learning data, a genre of the learning data, a creator of the learning data, a kind of objects in learning data, etc.

Also, the model training unit 1010-4 may teach a data recognition model using, for example, a learning algorithm including an error back-propagation method or a gradient descent method.

Further, the model training unit 1010-4 may, for example, train a data recognition model through supervised learning using a determination criterion as an input value. In addition, the model training unit 1010-4 may train itself using a required learning data without additional supervisions and train a data recognition model through unsupervised learning which discovers an identification criterion for determining a service to be provided or user's emotion. Further, the model training unit 1010-4 may teach the data recognition model through reinforcement learning using, for example, feedback as to whether a result of the judgment based on learning is correct.

In addition, when the data recognition model is trained, the model training unit 1010-4 may store the trained data recognition model. In this regard, the model training unit 1010-4 may store the trained data recognition model in the memory 110 of the electronic device 100. Alternatively, the model training unit 1010-4 may store the trained data recognition model in a memory of a server connected to the electronic device 100 via a wired or wireless network.

The data learning unit 1010 may further include a pre-processor 1010-2 and a learning data selector 131-3 to improve a recognition result of the data recognition model or to save resources or time required for generating the data recognition model.

The pre-processor 1010-2 may preprocess data acquired from the data acquisition portion 1010-1 to use the data for learning to determine a service to be provided or user's emotion.

For example, the pre-processor 1010-2 may process the acquired data in a predefined format so that it is easy to use the data for learning of the data recognition model. For example, the pre-processor 1010-2 may process a voice data acquired by the data acquisition unit 1010-1 into text data, and process the image data into image data of a predetermined format. The preprocessed data may be provided to the model training unit 1010-4 as learning data.

Alternatively, the learning data selector 1010-3 may selectively select learning data required for learning from among the preprocessed data. The selected learning data may be provided to the model training unit 1010-4. The learning data selector 1010-3 may select learning data required for learning from among the preprocessed data according to a predetermined criterion of selection. In addition, the learning data selector 1010-3 may select learning data required for learning according to a predetermined selection criterion by learning of the model training unit 1010-4. In one example embodiment of the disclosure, the learning data selector 1010-3 may select only voice data that has been uttered by a specific user among the input voice data, and may select only a region of the image data excluding the background.

The data training unit 1010 may further include a model evaluation unit 1010-5 to improve a recognition result of the data recognition model.

The model evaluation unit 1010-5 inputs evaluation data to the data recognition model, and when a recognition result output from the evaluation data does not satisfy a predetermined criterion, the model evaluation unit 1010-5 may instruct the model training unit 1010-4 to train again. In this case, the evaluation data may be predefined data for evaluating the data recognition model.

For example, if the number or the ratio of the evaluation data whose recognition result is not accurate among the recognition results of the learned data recognition model for the evaluation data exceeds a predetermined threshold value, the model evaluation unit 131-5 may evaluate that predetermined criteria are not satisfied. For example, in the case where a predetermined criterion is defined as a ratio of 2%, when the learned data recognition model outputs an incorrect recognition result for evaluation data exceeding 20 out of a total of 1000 evaluation data, the model evaluation unit 1010-5 may evaluate that the learned data recognition model is not suitable.

On the other hand, when there are a plurality of learned data recognition models, the model evaluation unit 1010-5 may evaluate whether each of the trained data recognition models satisfies a predetermined criterion, and determine a model satisfying the predetermined criterion as a final data recognition model. In this case, when there are a plurality of models satisfying a predetermined criterion, the model evaluation unit 1010-5 may determine any one or a predetermined number of models previously set in descending order of an evaluation score as a final data recognition model.

At least one of the data acquisition unit 1010-1, the preprocessing portion 1010-2, the learning data selector 1010-3, the model training unit 1010-4, and the model evaluation unit 1010-1 may be implemented as a hardware chip or may be manufactured in the form of a hardware chip and mounted on an electronic device. For example, at least one of the data acquisition unit 1010-1, the pre-processor 1010-2, the learning data selector 1010-3, the model training unit 1010-4, and the model evaluation unit 1010-5 may be manufactured in the form of a hardware chip exclusively used for AI, in the form of the existing universal processor (for example, CPU or AP), or as part of a graphic exclusive processor (e.g., GPU) to be mounted on the above-described various electronic devices.

The data acquisition unit 1010-1, the pre-processor 1010-2, the learning data selector 1010-3, the model training unit 1010-4, and the model evaluation unit 1010-5 may be mounted on one electronic device, or may be mounted on separate electronic devices, respectively. For example, some of the data acquisition unit 1010-1, the pre-processor 1010-2, the learning data selector 1010-3, the model training unit 1010-4, and the model evaluation unit 1010-5 may be included in an electronic device, and the rest may be included in a server.

At least one of the data acquisition unit 1010-1, the pre-processor 1010-2, the learning data selector 1010-3, the model training unit 1010-4, and the model evaluation unit 1010-5 may be realized as a software module. At least one of the data acquisition unit 1010-1, the pre-processor 1010-2, the learning data selector 1010-3, the model training unit 1010-4, and the model evaluation unit 1010-5 (or a program module including a supervised), the software module may be stored in a non-transitory computer readable media. Further, in this case, at least one software module may be provided by an OS or by a predetermined application. Alternatively, part of at least one of the at least one software module may be provided by an OS, and some of the at least one software module may be provided by a predetermined application.

Figure 12:
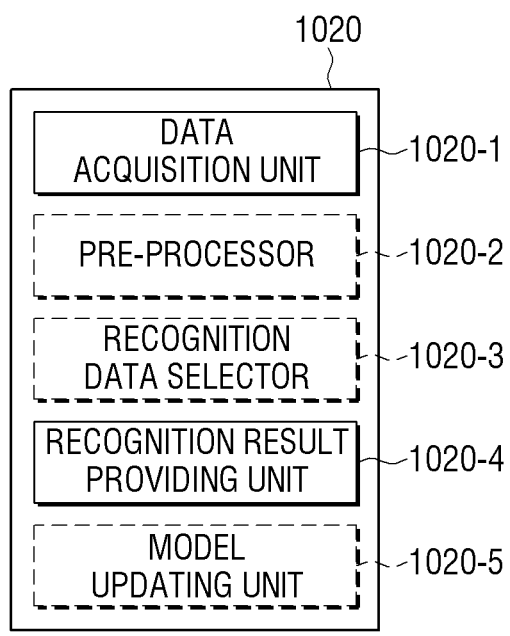

FIG. 12 is a block diagram of a data recognition unit, according to an embodiment of the disclosure.

Referring to FIG. 12, the data recognition unit 1020 according to some example embodiments may include a data acquisition unit 1020-1 and a recognition result providing unit 1020-4. In addition, the data recognition unit 1020 may further selectively include at least one of a pre-processor 1020-2, a recognition data selector 1020-3, and a model updating unit 1020-5.

The data acquisition unit 1020-1 may acquire recognition data necessary for determining a service to be provided or user's emotion.

The recognition result providing unit 1020-4 may apply the data acquired from the data acquisition unit 1020-1 as an input value to a trained data recognition model learned by the input value and determine a service to be provided or user's emotion. The recognition result providing unit 1020-4 may provide the recognition result according to a data recognition purpose. Alternatively, the recognition result providing unit 1020-4 may apply the data preprocessed by the pre-processor 1020-2 which will be described later as an input value to a trained data recognition model and provide an acquired recognition result. Alternatively, the recognition result providing unit 1020-4 may apply data selected by the data selector 1020-3 which will be described later as an input value to a data recognition model and provide a recognition result.

The data recognition unit 1210 may further include a pre-processor 1020-2 and a recognition data selector 1020-3 to improve a recognition result of the data recognition model or to save resources or time required for providing a recognition result.

The pre-processor 1020-2 may preprocess data acquired from the data acquisition unit 1020-1 to use the data for recognition to determine a service to be provided or user's emotion.

The pre-processor 1020-2 may process the acquired data in a predefined format so that it is easy to use the data for determining a service to be provided or user's emotion.

The recognition data selector 1020-3 may select recognition data necessary for determining a service to be provided or user's emotion from among the preprocessed data. The selected recognition data may be provided to the recognition result providing unit 1020-4. The recognition data selector 1020-3 may select recognition data necessary for determining a service to be provided or user's emotion from among the preprocessed data according to a predetermined selection criterion. The recognition data selector 1020-3 may also select data according to a predetermined selection criterion through learning by the model training unit 1010-4 described above.

The model updating unit 1020-5 may control a data recognition model to be updated based on an evaluation of a recognition result provided by the recognition result providing unit 1020-4. For example, the model updating unit 1020-5 may provide a recognition result provided by the recognition result providing unit 1020-4 to the model training unit 1010-4, to thereby control the model training unit 1010-4 to update a data recognition model.

At least one of the data acquisition unit 1020-1, the pre-processor 1020-2, the recognition data selector 1020-3, the recognition result providing unit 1020-4, and the model updating unit 1020-5 in the data recognition unit 1020, which is described above, may be fabricated in at least one hardware chip form and mounted on an electronic apparatus. For example, at least one of the data acquisition unit 1020-1, the pre-processor 1020-2, the recognition data selector 1020-3, the recognition result providing unit 1020-4, and the model updating unit 1020-5 may be manufactured in the form of a hardware chip exclusively used for AI, in the form of the existing universal processor (for example, CPU or AP), or as part of a graphic exclusive processor (e.g., GPU) to be mounted on the above-described various electronic devices.

The data acquisition unit 1020-1, the preprocessing unit 1020-2, the recognition data selecting unit 1020-3, the recognition result providing unit 1020-4, and the model updating unit 1020-5 may be mounted on an electronic device, or may be mounted on separate electronic devices, respectively. For example, some of the data acquisition unit 1020-1, the preprocessing unit 1020-2, the recognition data selecting unit 1020-3, the recognition result providing unit 1020-4, and the model updating unit 1020-5 may be included in an electronic device, and some may be included in a server.

At least one of the data acquisition unit 1020-1, the preprocessing unit 1020-2, the recognition data selecting unit 1020-3, the recognition result providing unit 1020-4, and the model updating unit 1020-5 may be implemented as a software module. At least one of the data acquisition unit 1020-1, the pre-processor 1020-2, the recognition data selector 1020-3, the recognition result providing unit 1020-4, and the model updating unit 1020-5 (or a program module including a supervised software module) may be stored in a non-transitory computer readable media. Further, in this case, at least one software module may be provided by an OS or by a predetermined application. Alternatively, part of at least one of the at least one software module may be provided by an OS, and some of the at least one software module may be provided by a predetermined application.

Figure 13:
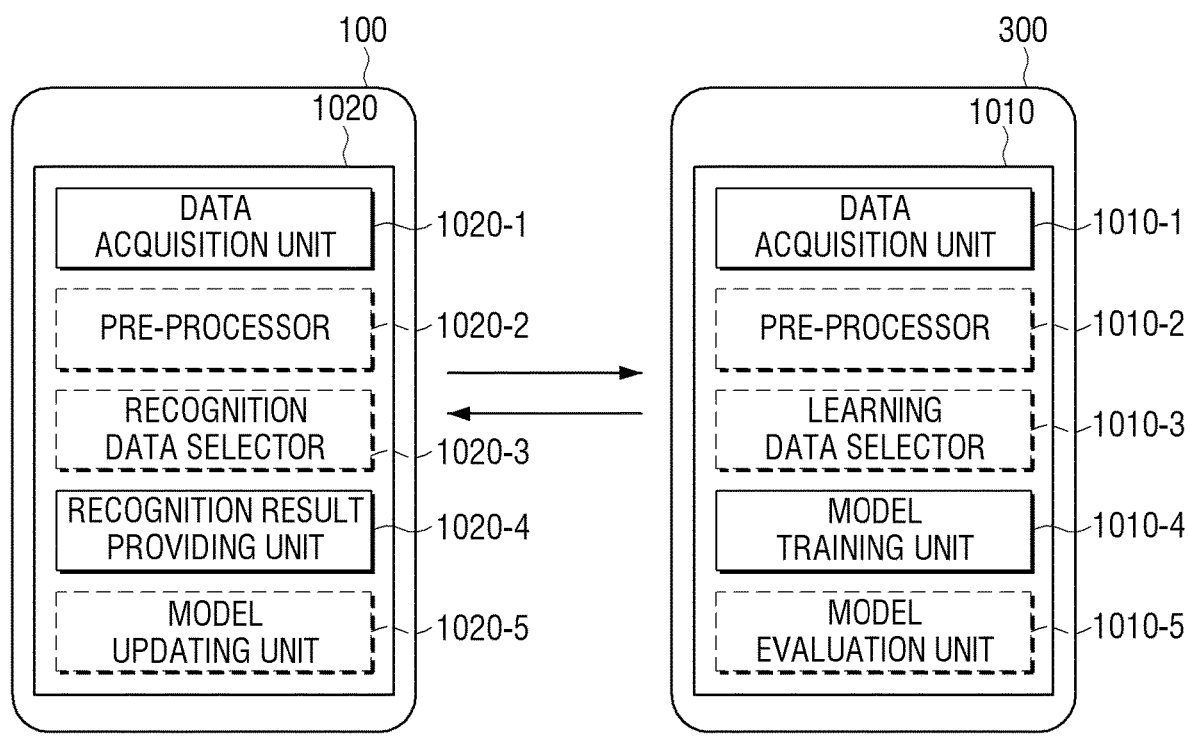

FIG. 13 is a diagram showing an example of learning and recognizing data by interlocking with an electronic device and a server according to an embodiment of the disclosure.

The data learning unit 1010 and the data recognition unit 1020 may be configurations included in the server 300, but are not limited thereto. That is, as illustrated in FIG. 13, as necessary, the electronic device 100 may include the data recognition unit 120, and the server 300 may include the data learning unit 1010.

Referring to FIG. 13, the server 300 may learn a criterion for determining a service to be provided or user's emotion, and the electronic device 100 may determine the service to be provided or the user's emotion based on a learning result by the server 300.

In this regard, the model training unit 1010-4 of the server 300 may learn what data to use to determine a service to be provided or user's emotion and a criterion on how to determine the service to be provided or the user's emotion by using data. The model training unit 1010-4 may acquire data to be used for learning, and apply the acquired data to a data recognition model to be described later, so as to learn a criterion for determining a service to be provided or user's emotion.

The recognition result providing unit 1020-4 of the electronic device 100 may apply data selected by the recognition data selector 1020-3 to a data recognition model generated by the server 300 to determine a service to be provided and user's emotion. More specifically, the recognition result providing unit 1020-4 may transmit data selected by the recognition data selector 1020-3 to the server 300, and may request that the server 300 applies the data selected by the recognition data selector 1020-3 to a recognition model and determines a service to be provided or user's emotion. In addition, the recognition result providing unit 1020-4 may receive from the server 300 information about a service to be provided or user's emotion. For example, when voice data and image data is transmitted from the recognition data selector to the server 300, the server 300 may apply the voice data and the image data to a pre-stored data recognition model to transmit information about a service to be provided or user's emotion to the electronic device 100.

Alternatively, the recognition result providing unit 1020-4 of the electronic device 100 may receive a recognition model generated by the server 300 to the server 300, and determine a service to be provided or user's emotion using the received recognition model. In this regard, the recognition result providing unit 1020-4 of the electronic device 100 may apply data selected by the recognition data selector 1020-3 to a data recognition model received from the server 300 to determine a service to be provided and user's emotion. For example, the electronic device 100 may receive a data recognition model from the server 300 and store the same, and may apply voice data and image data selected by the recognition data selecting unit 1020-3 to the data recognition model received from the server 300 to determine information about a service to be provided or user's emotion.

Figure 14:
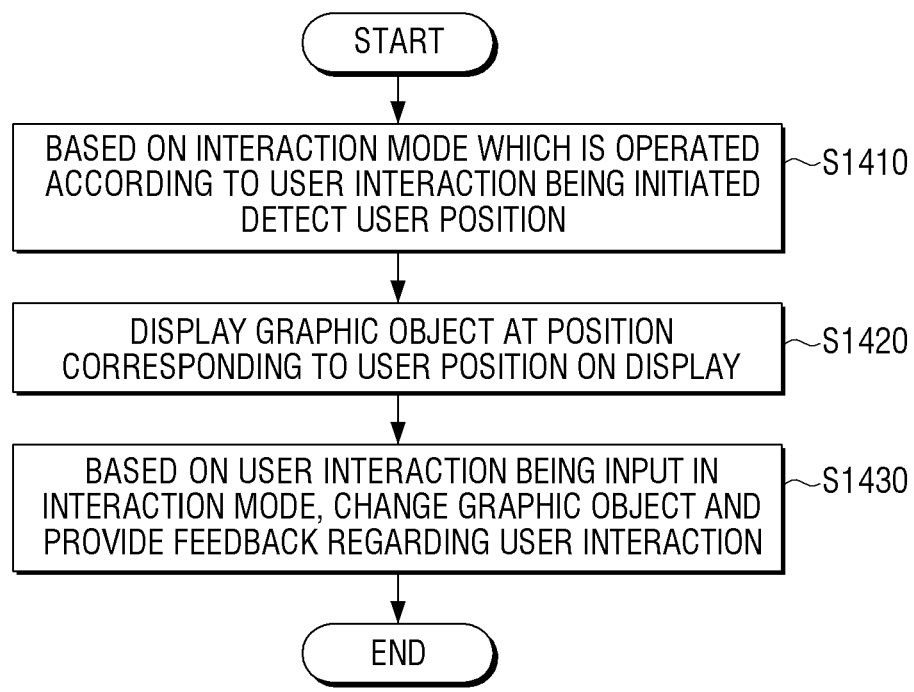
FIG. 14 is a flowchart illustrating a method for controlling an electronic device, according to an embodiment of the disclosure.

FIG. 14 is a flowchart illustrating a displaying method of an electronic device, according to an embodiment of the disclosure.

When an interaction mode to operate according to a user's interaction is initiated, the electronic device 100 may detect a user's position, at operation S1410. As described above, the interaction mode may be initiated when a particular condition is met. For example, the interaction mode may be initiated when the electronic device 100 and the external device 200 are docked with each other, when wireless charging of the electronic device 100 is initiated by a wireless charging device of the external device 200, and when a particular command of the user, such as a gesture, a voice, or the like, is input.

The electronic device 100 may display a graphic object at a position corresponding to a user's position on the display 110, at operation S1420. In more detail, the electronic device 100 may acquire distance and position information between the electronic device 100 and the user, and differently display an object according to the acquired distance and position information. For example, when the user is positioned on the left side of the electronic device 100, a graphic object may be displayed on the right side of the display 110. Alternatively, when a distance between the electronic device 100 and the user is far, a graphic object may be displayed large. When a distance between the electronic device 100 and the user is close, the graphic object may be displayed small. Alternatively, the electronic device 100 may display a graphic object such that the user always views the graphic object from the front side.

When a user's interaction is input in the interaction mode, the electronic device 100 may change a graphic object and provide feedback regarding the user's interaction, at operation S1430. In more detail, when a user's interaction to receive a particular service is input, the electronic device 100 may provide a service corresponding to the user's interaction. For example, a user's command for music recommendation is input, the electronic device 100 may recommend appropriate music to the user based on the user's condition, taste, emotion, and the like.

Meanwhile, the disclosure is not necessarily limited to these embodiments, as all the elements constituting the embodiment of the disclosure are described as being combined or operated in one operation. That is, within the scope of the disclosure, all of the elements may be selectively coupled to one or more of them. In addition, although all of the components may be implemented as one independent hardware, some or all of the components may be selectively combined and implemented as a computer program having a program module to perform a part or all of the functions in one or a plurality of hardware.

At least some of the devices (e.g., modules or functions thereof) or methods (e.g., operations) according to various example embodiments may be implemented to be a program module format of commands stored in a transitory or non-transitory computer readable recording medium. When a command is executed by a processor (e.g., the processor 120), the processor may perform a function corresponding to the command.

Here, the program may be stored in a computer-readable non-transitory recording medium and read and executed by a computer, thereby realizing the embodiments of the disclosure.

Here, the non-transitory readable recording medium refers to a medium that semi-permanently stores data and is capable of being read by a device, and includes a register, a cache, a buffer, and the like, but does not include transmission media such as a signal, a current, etc.

In detail, the programs described above may be stored and provided in the non-transitory computer readable medium such as a compact disc (CD), a digital versatile disc (DVD), a hard disk, a Blu-ray disk, a universal serial bus (USB), an internal memory (e.g., the memory 110), a memory card, a ROM, a RAM, or the like.

In addition, the method according to the above-described example embodiments may be provided as a computer program product.

The computer program product may include a software (S/W) program, a computer readable storage medium in which the S/W program is stored or a product traded between a seller and a consumer.

For example, the computer program product may include an electronic apparatus or a product (e.g., a downloadable app) in the form of an S/W program electronically distributed by a manufacturer of the electronic apparatus or an electronic market (e.g., Google play store and App store). For electronic distribution, at least some of the S/W program may be stored in the storage medium or may be temporarily generated. In this case, the storage medium may be a server of a manufacturer, a server of an electronic market or a relay server which temporarily stores an S/W program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a first camera; and
   a processor,
   wherein the processor is configured to:
      based on an interaction mode which is operated according to a user interaction being initiated, activate the first camera and acquire an image captured by the first camera, acquire a position of a user based on the captured image, and control the display to display a graphic object at a position corresponding to the acquired position, and
      based on the user interaction being input in the interaction mode, change the graphic object and control the display to provide feedback regarding the user interaction.

2. The electronic device of claim 1, further comprising:
   a second camera which is disposed in an opposite direction to the direction of the first camera,
   wherein the first camera is disposed in a direction of the display, and
   wherein the processor is further configured to, based on the interaction mode being initiated, activate the first camera and the second camera, respectively, and adjust a display state of the graphic object in accordance with an image acquired by the second camera.

3. The electronic device of claim 1, wherein the processor is further configured to:
   analyze a user image acquired by the first camera and estimate an emotion of the user, and
   determine a look of a face of the graphic object according to the estimated emotion.

4. The electronic device of claim 1,
   wherein the interaction mode is a voice recognition mode which is operated according to a voice of the user, and
   wherein the processor is further configured to continually change the graphic object to correspond to an input process of the voice and a processing process of the voice.

5. The electronic device of claim 1,
   wherein the interaction mode is a motion recognition mode which is operated according to a motion of the user, and
   wherein the processor is further configured to continually change the graphic object to correspond to an input process of a voice of the user and a processing process of a motion of the user.

6. The electronic device of claim 1, wherein the processor is further configured to, based on the electronic device being positioned on a wireless charging device and wireless charging being initiated, determine that the interaction mode is initiated and control the display to display the graphic object.

7. The electronic device of claim 1, wherein the processor is further configured to, based on the electronic device being docked with an external device, determine that the interaction mode is initiated and control the display to display the graphic object.

8. The electronic device of claim 3, wherein the processor is further configured to input the user image to an artificial intelligence (AI) neural network model to estimate the emotion.

9. A displaying method of an electronic device comprising a first camera which is disposed in a direction of the display, the method comprising:
   activating the first camera and acquiring an image captured by the first camera, based on an interaction mode which is operated according to a user interaction being initiated,
   acquiring a position of a user based on the captured image;
   displaying, on a display of the electronic device, a graphic object at a position corresponding to the acquired position; and changing, based on the user interaction being input in the interaction mode, the graphic object and providing feedback regarding the user interaction.

10. The method of claim 9, further comprising:
activating a second camera which is disposed in an opposite direction to the direction of the first camera; and
adjusting a display state of the graphic object in accordance with an image acquired by the second camera.

11. The method of claim 9, further comprising:
analyzing a user image acquired by the first camera and estimating an emotion of the user; and
determining a look of a face of the graphic object according to the estimated emotion.

12. The method of claim 9,
wherein the interaction mode is a voice recognition mode which is operated according to a voice of the user, and
wherein the providing of the feedback regarding the user interaction comprises continually changing the graphic object to correspond to an input process of the voice and a processing process of the voice.

13. The method of claim 9,
wherein the interaction mode is a motion recognition mode which is operated according to a motion of the user, and
wherein the providing of the feedback regarding the user interaction comprises continually changing the graphic object to correspond to an input process of the motion and a processing process of the motion.

14. The method of claim 9, further comprising:
determining, based on the electronic device being positioned on a wireless charging device and wireless charging being initiated, that the interaction mode is initiated.

15. The method of claim 9, further comprising:
determining, based on the electronic device being docked with an external device, that the interaction mode is initiated.

16. The method of claim 11, wherein the estimating of the emotion comprises inputting the user image to an artificial intelligence (AI) neural network model to estimate the emotion.

17. A non-transitory computer-readable medium storing instructions executable by at least one processor of an electronic device to perform:
activating, based on an interaction mode which is operated according to a user interaction being initiated, a front camera and a rear camera;
acquiring a first image captured by the front camera and a second image captured by the rear camera;
acquiring a user position based on the first image;
detecting a surrounding background based on the second image;
displaying a graphic object in a form corresponding to the surrounding background at a position corresponding to the acquired user position; and
changing, based on the user interaction being input in the interaction mode, the graphic object and providing feedback regarding the user interaction.

* * * * *